(12) United States Patent
Nakada

(10) Patent No.: US 11,809,370 B2
(45) Date of Patent: Nov. 7, 2023

(54) RESERVOIR COMPUTING DATA FLOW PROCESSOR

(71) Applicant: TDK CORPORATION, Tokyo (JP)

(72) Inventor: Kazuki Nakada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 514 days.

(21) Appl. No.: 17/111,934

(22) Filed: Dec. 4, 2020

(65) Prior Publication Data

US 2021/0263884 A1 Aug. 26, 2021

Related U.S. Application Data

(63) Continuation-in-part of application No. PCT/JP2019/047549, filed on Dec. 5, 2019.

(51) Int. Cl.
*G06F 15/82* (2006.01)
*G06F 30/20* (2020.01)
*G06F 111/10* (2020.01)

(52) U.S. Cl.
CPC .......... *G06F 15/825* (2013.01); *G06F 30/20* (2020.01); *G06F 2111/10* (2020.01)

(58) Field of Classification Search
None
See application file for complete search history.

(56) References Cited

U.S. PATENT DOCUMENTS 6,292,791 B1  9/2001  Su et al.
2022/0101043 A1*  3/2022  Katz ............... H03M 13/15

OTHER PUBLICATIONS

Feb. 18, 2020 International Search Report issued in International Patent Application No. PCT/JP2019/047549.
L. Appeltant et al. "Information Processing Using a Single Dynamical Node as Complex System". Nature Communications, vol. 2, No. 468, Sep. 13, 2011, pp. 1-6.
Lennert Appeltant. "Reservoir Computing Based on Delay-Dynamical Systems". Vrije Universiteit Brussel, May 2012.
Joseph D. Hart et al. "Delayed Dynamical Systems: Networks, Chimeras and Reservoir Computing". [online] Aug. 14, 2018, retrieved on Oct. 10, 2019,<URL:https://arxiv.org/abs/1808.04596>.

(Continued)

*Primary Examiner* — Scott C Sun
(74) *Attorney, Agent, or Firm* — Oliff PLC

(57) ABSTRACT

A reservoir computing data flow processor includes a plurality of reservoir units to be units constituting a reservoir. The reservoir is able to be reconfigured by changing a connection relationship between the reservoir units. Each of the reservoir units is an operation unit block configured to execute a predetermined operation. The operation unit block includes a first adder configured to perform an addition operation on at least two inputs, a nonlinear operator configured to apply a nonlinear function to an output from the first adder or a result of multiplying the output by a predetermined coefficient, and a second adder configured to perform an addition operation on at least two inputs including an output from the nonlinear operator or a result of multiplying the output by a predetermined coefficient.

20 Claims, 9 Drawing Sheets

(56) References Cited

OTHER PUBLICATIONS

Dhireesha Kudithipudi et al. "Design and Analysis of a Neuromemristive Reservoir Computing Architecture for Biosignal Processing". [online] Frontiers in Neuroscience, vol. 9, article 502, Feb. 1, 2016, pp. 1-17, <DOI:10.3389/fnins.2015.00502> [retrieved on Feb. 6, 2020] <URL: https://www.frontiersin.org/articles/10.3389/fnins.2015.00502/full>.

Yoshiaki Kawamura. "Learning for Recurrent Neural Networks". Journal of Japan Society for Fuzzy Theory and Systems, vol. 7, No. 1, Feb. 15, 1995, pp. 52-56.

"Encyclopedia Electronics". Information and Communication Handbook, IEICE, First edition, Ohmsha, Ltd., Nov. 30, 1998, pp. 76-84.

Herbert Jaeger et al. "Harnessing Nonlinearity: Predicting Chaotic Systems and Saving Energy in Wireless Communication". Science, vol. 304, No. 5667, 2004, pp. 78-80.

David Sussillo et al. "Generating Coherent Patterns of Activity From Chaotic Neural Networks". Neuron, vol. 63, No. 4, Aug. 27, 2009, pp. 544-557.

P. Nieters et al. "Neuromorphic Computation in Multi-Delay Coupled Models". IBM Journal of R&D, vol. 61, No. 2-3, 2017.

Erik S. Skibinsky-Gitlin et al. "Cyclic Reservoir Computing With FPGA Devices for Efficient Channel Equalization". ICAISC 2018: Artifical Intelligence and Soft Computing, 2018, pp. 226-234.

\* cited by examiner

RESERVOIR COMPUTING DATA FLOW PROCESSOR

TECHNICAL FIELD

The present disclosure relates to a reservoir computing data flow processor.

BACKGROUND ART

Various machine learning algorithms and architectures have been proposed for time series signal processing. In such machine learning for time series processing, for example, hardware implementation using a field programmable gate array (FPGA) or an application specific integrated circuit (ASIC) is in progress.

Time series signals are regarded as stream data that changes from moment to moment. For example, time series signals may include a signal corresponding to sensor data representing a status of equipment and a process that operates in a factory, a biological signal obtained from a wearable device, or the like. By measuring and analyzing such time series signals, it is possible to obtain a anticipation of a mechanical failure or a sign of a biological disease.

As machine learning for time series signal processing, there is a recurrent neural network that can handle time series signals by recursively using past outputs as current inputs, and various architectures such as a Long Short-Term Memory (LSTM), which is a derivative thereof, and a Gated Recurrent Unit (GRU) have been proposed.

In such architectures, it is necessary to learn weight parameters of a neural network on the basis of stream data having a certain data length corresponding to a sampling section of a time series signal. Thus, in such architectures, it may be difficult to implement the above on an edge device or the like and execute learning in real time.

Technology for representing an architecture of a neural network serving as a learning target through a Data Flow Graph (DFG) to achieve high efficiency in an operation and in updating weight parameters through, for example, automated differentiation on a computational graph, in the case of either software or hardware implementation, has been developed. However, in the recursive architecture such as the LSTM or the GRU, it is difficult to efficiently represent a DFG that contributes to the computation of forward propagation and back propagation which are executed during learning and a process of efficiently representing the DFG is one of the significant issue to achieve high efficiency in learning. Actually, several data flow processors for machine learning that have been proposed so far are mainly for deep learning (suitable for a convolution operation in the deep learning) of the architecture of a hierarchical configuration and there are few challenges for time series learning.

Therefore, reservoir computing has been proposed and its effectiveness is being shown.

In the reservoir computing, the weight of an intermediate layer (a reservoir) is fixed and learning is performed only in an output layer (a readout) to reduce the computational amount of learning. That is, the significant efficiency is achieved by reducing computation corresponding to the back propagation during a learning process.

Therefore, for example, such reservoir computing is expected to be applied to online learning on an edge device with limited computational resources.

However, for example, the achievement of speeding up/efficiency according to applications is required through physical implementation by hardware or parallel computation by software with respect to an operation of the reservoir corresponding to the forward propagation (update of an internal state value of the intermediate layer), Therefore, various technologies have been proposed so far to achieve the speeding up/efficiency of reservoir computing.

For example, Non-Patent Document 1 shows that a reservoir of a one-dimensional ring topology and an interconnected reservoir having a specific weight parameter distribution are mathematically equivalent from a theoretical standpoint (see Non-Patent Document 1).

For example, Non-Patent Document 2 and Non-Patent Document 3 propose technology for extending the theoretical analysis in Non-Patent Document 1 (see Non-Patent Document 2 and 3). In Non-Patent Document 2 and Non-Patent Document 3, it is assumed that the physical implementation is achieved by a delay-time reservoir having a one-dimensional ring topology configuration.

Such a one-dimensional ring topology reservoir has an architecture suitable for implementing an optical laser that operates at a high speed.

CITATION LIST

Non-Patent Literature

Non-Patent Document 1

L. Appeltant et al., "Information processing using a single dynamical node as complex system," NATURE COMMUNICATIONS, vol. 2. Article No. 468, Sep. 13, 2011

Non-Patent Document 2

L. Appeltant, "Reservoir computing based on Delay-dynamical Systems," Vrije Universiteit Brussel, May 2012

Non-Patent Document 3

J. D. Hart et al., "Delayed Dynamical Systems: Networks, Chimeras and Reservoir Computing," [online], Aug. 14, 2018 [found on Oct. 10, 2019], Internet <URL: https://arxiv.org/abs/1808.04596>

SUMMARY OF INVENTION

Technical Problem

Although various types of devices and elements have been proposed as hardware for realizing physical reservoir computing, i.e., physically implementing a reservoir (an intermediate layer) that contributes to reservoir computing, the most of these are not suitable for CMOS integrated implementation by an FPGA or an ASIC and their design principles have also not yet been systematized.

For example, in Non-Patent Document 1, an architecture of an interconnected configuration when the reservoir (the intermediate layer) is physically implemented is not taken into account. As an alternative, by introducing a virtual node and performing sequential nonlinear operations in a time-division manner, a reservoir mathematically equivalent to a reservoir having a specific interconnected configuration is computed.

Also, although an operation equation of a virtual node in the reservoir is derived in Non-Patent Documents 2 and 3, technology for integrating and implementing the operation equation as an FPGA or an ASIC of a two-dimensional array is not taken into account.

In general, it is not always possible to map a mathematical model of any reservoir onto an integrated circuit as it is. A configuration (a coupling structure) of a reservoir layer that contributes to the reservoir computing is not limited to adjacent coupling as in the one-dimensional ring topology and the two-dimensional array. Therefore, it is necessary to arrange nodes (neurons) that constitute the reservoir layer in parallel in a space domain and to implement a connection (wiring) between the complicated nodes so that the mathematical model of the reservoir is physically implemented.

However, there are restrictions on resources that can be used as wiring layers when the reservoir is physically implemented as an integrated circuit. For example, even if a maximum of five metal layers can be used as wiring in a standard semiconductor fabrication process, because there is an upper limit to the number of wirings that can intersect between nodes, realistic implementation is hard as scaling up of the reservoir, the wiring complexity ($O(n^2)$) increases with the increasing the number of the nodes (n)

Also, when the reservoir is implemented as hardware, it is not always possible to implement a desirable data flow (not a control flow) for achieving high efficiency in an operation corresponding to forward propagation. For example, if a DFG that represents a mathematical model of a reservoir becomes complicated, wiring length between the nodes that constitute the reservoir will differ, so the wiring delays will be distributed and the agreement of the operation with the mathematical model will not be guaranteed. This makes device design difficult for designers.

As described above, a dedicated device serving as physical implementation of reservoir computing has not been sufficiently studied in the conventional technology. In particular, the means for solving a limit of scalability due to the complexity of wiring have not been sufficiently considered. Also, the means for achieving the efficiency of data flow control (not a control flow represented by a flow chart) is not specifically implemented.

The present disclosure has been made to solve such a problem and an objective of the present disclosure is to provide a reservoir computing data flow processor which is a dedicated reservoir computing device suitable for configuring a reservoir.

Solution to Problem

According to an aspect of the present disclosure, there is provided a reservoir computing data flow processor including: a plurality of reservoir units to be units constituting a reservoir, wherein the reservoir is able to be reconfigured by changing a connection relationship between the reservoir units, wherein each of the reservoir units is an operation unit block configured to execute a predetermined operation, and wherein the operation unit block includes a first adder configured to perform an addition operation on at least two inputs, a nonlinear operator configured to apply a nonlinear function to an output from the first adder or a result of multiplying the output by a predetermined coefficient, and a second adder configured to perform an addition operation on at least two inputs including an output from the nonlinear operator or a result of multiplying the output by a predetermined coefficient.

According to an aspect of the present disclosure, the reservoir computing data flow processor further includes a first block configured to connect the reservoir units; a second block configured to perform input and output processes; and a data flow controller configured to change a data flow by switching the connection relationship between the reservoir units on the basis of data flow representation of a mathematical model of a reservoir.

According to an aspect of the present disclosure, in the reservoir computing data flow processor, the reservoir is able to be reconfigured in a programmable manner.

According to an aspect of the present disclosure, in the reservoir computing data flow processor, the reservoir is able to be reconfigured on the basis of predetermined information in accordance with a desirable data flow graph.

According to an aspect of the present disclosure, in the reservoir computing data flow processor, a plurality of operation unit blocks are arranged in parallel in a space domain.

According to an aspect of the present disclosure, in the reservoir computing data flow processor, a plurality of operation unit blocks are arranged in parallel in a time domain.

According to an aspect of the present disclosure, in the reservoir computing data flow processor, the first adder is configured to perform an addition operation at least on: a signal corresponding to an output signal from the second adder of a previous time or a result of multiplying the signal by a predetermined coefficient; and an input signal to the reservoir or a result of multiplying the input signal by a predetermined coefficient.

According to an aspect of the present disclosure, in the reservoir computing data flow processor, the second adder is configured to perform an addition operation at least on: an output from the nonlinear operator or a result of multiplying the output by a predetermined coefficient; and a signal corresponding to an output signal from the second adder of another stage among a plurality of stages arranged in parallel in a space domain or a result of multiplying the signal by a predetermined coefficient.

Advantageous Effects of Invention

According to an aspect of the present disclosure, it is possible to provide a reservoir computing data flow processor suitable for mapping a mathematical model of a reservoir onto a hardware, resulting in high computational efficiency or reduction of computational resources.

DESCRIPTION OF EMBODIMENTS

Hereinafter, embodiments of the present disclosure will be described with reference to the drawings.

[Reservoir Computing Data Flow Processor]

Figure 1:
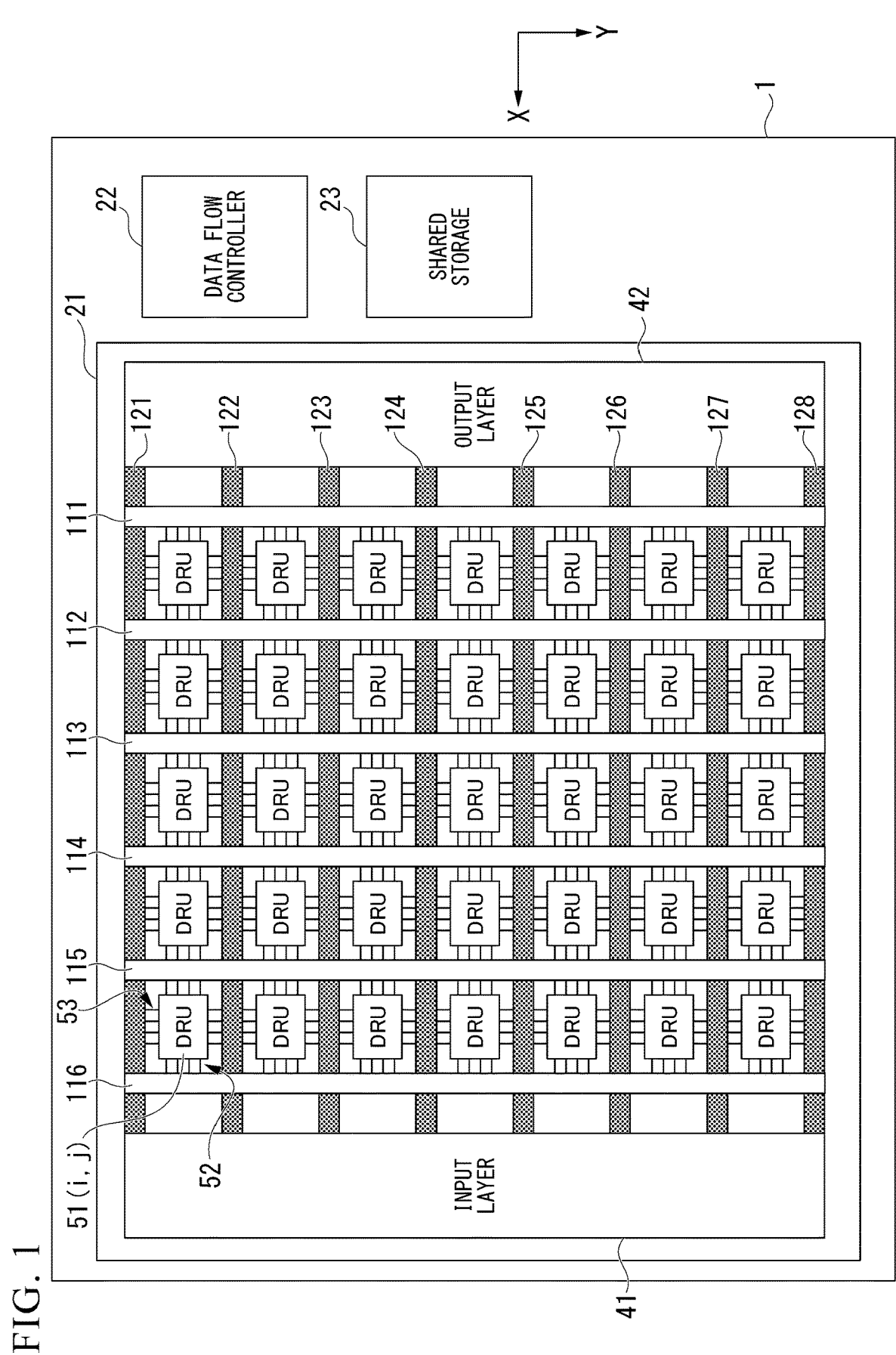
FIG. 1 is a diagram showing a schematic configuration of a reservoir computing data flow processor according to an embodiment of the present disclosure.

FIG. 1 is a diagram showing a schematic configuration of a reservoir computing data flow processor 1 according to an embodiment of the present disclosure.

Also, in FIG. 1, an XY coordinate system, which is a Cartesian coordinate system, is shown for convenience of description.

In the present embodiment, the reservoir computing data flow processor 1 is implemented as an ASIC that performs digital processing.

The reservoir computing data flow processor 1 includes an array 21, a data flow controller 22 which is an example of a controller, and a shared storage 23 which is an example of a storage.

Also, the reservoir computing data flow processor 1 may be configured without including the shared storage 23.

In the present embodiment, the reservoir computing data flow processor 1 may be connected to each of an input layer 41 and an output layer 42 of the reservoir computing.

Also, the reservoir computing data flow processor 1 itself does not need to have the input layer 41 and the output layer 42.

<Array>

The array 21 will be described.

The array 21 is configured by arranging a plurality of digital reservoir units (DRUs) as building blocks (functional blocks) in an array shape. Each reservoir unit is connected to functional blocks such as a connecting block (CB) and an input/output (I/O) interface block (IB).

In the present embodiment, for convenience of description, the digital reservoir unit may be referred to as the DRU, the connecting block may be referred to as the CB, and the input/output interface block may be referred to as the IB.

The DRU includes a plurality of operators for executing an operation corresponding to the virtual node of the reservoir as a physical node. The plurality of operators include an operator that performs a nonlinear operation.

The CB has a function of receiving a state value of the DRU as an intermediate signal and performing a bridge role in providing the state value as an input to nearby different DRUs. Also, the CB has a memory function of retaining the state value of each DRU at a certain time.

The IB has a function of giving an input signal from the input layer to each DRU and passing a state value of a desired DRU as an output signal to the output layer. Also, the IB has a function of feeding back the state value of a certain DRU at a certain time as an input to the certain DRU at the next time. Also, the IB may feed back the state value of a certain DRU at a certain time as an input to any DRU a certain time period later as well as at the next time.

In the present embodiment, a plurality of DRUs are arranged on a plane in the array 21.

In the present embodiment, for convenience of description, two directions orthogonal to each other on the plane will be referred to as a vertical direction and a horizontal direction. Also, in the example of FIG. 1, a direction parallel to an X-axis is referred to as the horizontal direction and a direction parallel to a Y-axis is referred to as the vertical direction. Also, in the example of FIG. 1, a case in which the number of stages of the DRUs in the horizontal direction increases in a positive direction of the X-axis and the number of stages of the DRUs in the vertical direction increases in a positive direction of the Y-axis will be described.

Also, in the present embodiment, the plurality of functional blocks are arranged according to a predetermined pattern.

In the example of FIG. 1, one DRU is represented by reference sign "51($i, j$)." In the present embodiment, each DRU is distinguished as a DRU 51($i, j$).

Here, it is assumed that i (i is an integer greater than or equal to 1) represents the number of stages in the vertical direction and a maximum value thereof is L in the present embodiment. In the present embodiment, L is an integer greater than or equal to 2. In the example of FIG. 1, L is 7.

Also, it is assumed that j (j is an integer greater than or equal to 1) represents the number of stages in the horizontal direction and a maximum value thereof is k in the present embodiment. In the present embodiment, k is an integer greater than or equal to 2. In the example of FIG. 1, k is 5.

Also, in the example of FIG. 1, CBs are distinguished as CBs 111 to 116.

Also, in the example of FIG. 1, IBs are distinguished as IBs 121 to 128.

The arrangement of functional blocks such as the CBs 111 to 116 and the Ms 121 to 128 will be described.

The present disclosure is not limited to the example of FIG. 1 and various arrangements may be used as arrangements of the CBs 111 to 116 and the IBs 121 to 128.

Also, the present disclosure is not limited to the example of FIG. 1 and other functional blocks may be used in the array 21.

The arrangement of functional blocks in the example of FIG. 1 will be described.

For example, the CB 111, the CB 112, the CB 113, the CB 114, the CB 115, and the CB 116 are arranged as an arrangement of six functional blocks in the horizontal direction. At this time, the arrangement is made so that the number of CBs 111 to 116 becomes (k+1) with respect to the number of stages (k) of the DRUs 51($i, j$) in the horizontal direction.

Also, the IB 121, the IB 122, the IB 123, the IB 124, the IB 125, the IB 126, the IB 127, and the IB 128 are arranged as an arrangement of eight functional blocks in the vertical direction. At this time, the arrangement is made so that the number of IBs 121 to 128 becomes (L+1) with respect to the number of stages (L) of the DRUs 51($i, j$) in the vertical direction.

The arrangement is made so that the CBs 111 to 116 across a plurality of stages in the vertical direction intersect the IBs 121 to 128 across a plurality of stages in the horizontal direction.

The wiring will be described.

Also, a wiring connection relationship shown in FIG. 1 is a schematic example for illustration.

The present disclosure is not limited to the example of FIG. 1 and various connection relationships may be used with respect to the DRUs $51(i, j)$, the CBs 111 to 116, and the IBs 121 to 128.

The present disclosure is not limited to the example of FIG. 1 and the number of terminals connected to other functional blocks may be any number in functional blocks of the DRUs $51(i, j)$, the CBs 111 to 116, and the IBs 121 to 128.

The number of wiring elements included in each of the CBs 111 to 116 and the IBs 121 to 128 may be any number.

The wiring in the example of FIG. 1 will be described.

The DRUs $51(i, j)$ are connected to the adjacent CBs 111 to 116 and the adjacent IBs 121 to 128 via terminals. Bus-type wiring is provided inside the CBs 111 to 116 and the IBs 121 to 128 and intersections of the IBs 121 to 128 and the CBs 111 to 116 can be connected via vias. The functional blocks of the DRUs $51(i, j)$, the CBs 111 to 116, and the IBs 121 to 128 have a switch and a path of an input/output signal can be changed with coupling between the DRUs $51(i, j)$ through switching according to a control signal from the data flow controller 22. That is, the reservoir computing data flow processor 1 according to the present embodiment becomes a reconfigurable data flow processor.

The DRUs $51(i, j)$ have connectors for the CBs 111 to 116 adjacent to the DRUs $51(i, j)$ and connectors for the IBs 121 to 128 adjacent to the DRUs $51(i, j)$.

The DRUs $51(i, j)$ can be connected to the CBs 111 to 116 via the connectors for the CBs 111 to 116 adjacent to the DRUs $51(i, j)$.

The DRUs $51(i, j)$ can be connected to the IBs 121 to 128 via the connectors for the IBs 121 to 128 adjacent to the DRUs $51(i, j)$.

Also, in the example of FIG. 1, in one DRU $51(i, j)$, only a connector 52 that can be connected to one CB 116 and a connector 53 that can be connected to one IB 121 are represented by reference signs.

<Data Flow Controller and Shared Storage>

The data flow controller 22 controls various types of processes and data flows.

The data flow controller 22 changes a wiring connection relationship with respect to a plurality of functional blocks included in the array 21. For example, the term "changeable" may be referred to as the term "configurable" or "reconfigurable." That is, for example, the data flow controller 22 can initially configure the reservoir implemented by the array 21 by changing the connection relationship of the plurality of functional blocks included in the array 21 or configure (i.e., reconfigure) another reservoir by changing a reservoir that has already been configured.

Also, for example, the data flow controller 22 may automatically perform the above-described configuration (or reconfiguration) on the basis of a predetermined rule or the like or may perform the above-described configuration (or reconfiguration) on the basis of content of a manipulation performed by the user. A case in which the above-described configuration (or reconfiguration) can be performed on the basis of the content of the manipulation performed by the user may be referred to as a programmable case. Thus, the data flow controller 22 has a function of storing and retaining content of the configuration programmed by the user.

The shared storage 23 stores various types of information, for example, the state value of the DRU $51(i, j)$ at each time.

The shared storage 23 is used to store information when needed by the data flow controller 22.

For example, the data flow controller 22 performs a process of writing information to the shared storage 23 and a process of reading the information stored in the shared storage 23.

Also, in the array 21, for example, only the reservoir body (the intermediate layer) may be configured or the reservoir and another logic circuit related to the reservoir may be configured. The other logic circuit may be, for example, one or both of the input layer 41 for the reservoir and the output layer 42 for the reservoir. The array 21 may include a logic circuit for learning a weight parameter of coupling from the reservoir (the intermediate layer) to the output layer 42.

Also, the array 21 may include any number of functional blocks in any arrangement.

Also, the array 21 may include any number of wiring elements in any arrangement.

The array 21 may be able to configure (or reconfigure) a reservoir in which a number of various functional blocks are connected in various wiring connection relationships.

<Operation Unit Block>

An operation unit block will be described with reference to FIGS. 2 to 5.

In the present embodiment, for convenience of description, a functional block that can be used as the DRU $51(i, j)$ of the array 21 is referred to as the operation unit block. In the present embodiment, the operation unit block is a device of a minimum unit that is reconfigurable as a block that performs a predetermined operation in an operation circuit of the reservoir computing.

Also, in the present embodiment, for example, the CB of the array 21 may be referred to as a connection unit block or the like for convenience of description.

Also, in the present embodiment, for example, the IB of the array 21 may be referred to as an input/output unit block or the like for convenience of description.

Figure 2:
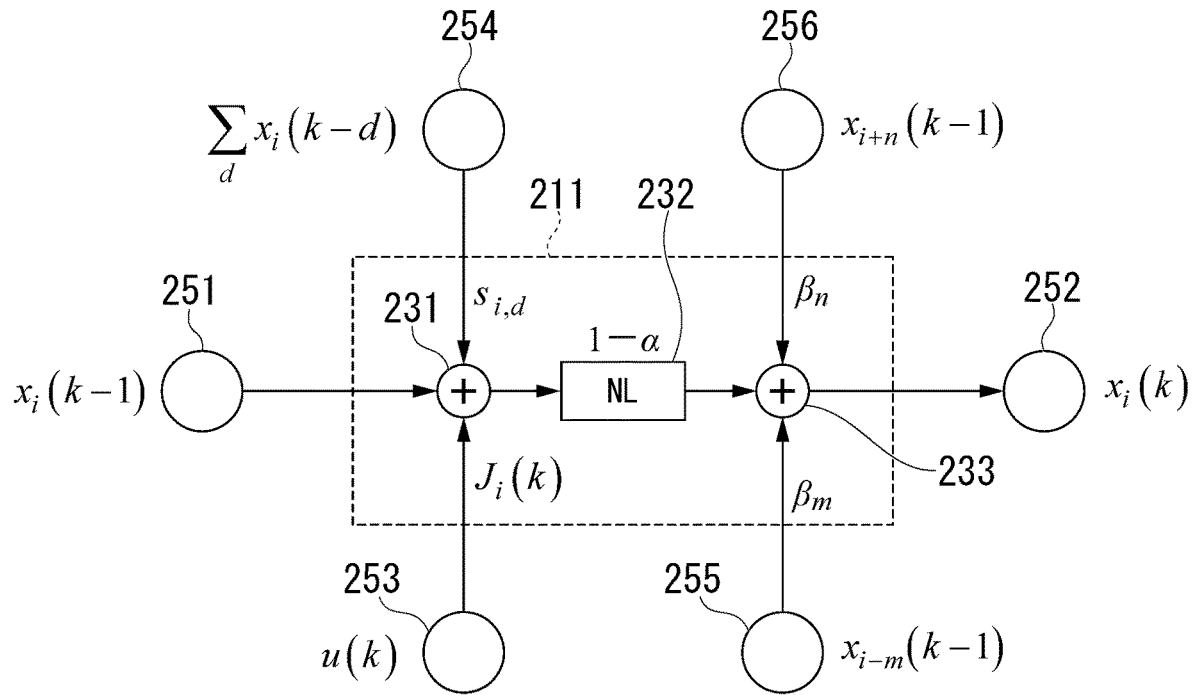
FIG. 2 is a diagram showing an example of an operation unit block according to the embodiment of the present disclosure.

FIG. 2 is a diagram showing an example of an operation unit block 211 according to the embodiment of the present disclosure.

The operation unit block 211 includes an adder 231, a nonlinear operator 232, and an adder 233.

Also, in FIG. 2, five input terminals 251 and 253 to 256 to the operation unit block 211 and one output terminal 252 from the operation unit block 211 are shown.

In the present embodiment, the input terminals 251 and 253 to 256 and the output terminal 252 are virtual terminals for convenience of description. Also, for example, the input terminals 251 and 253 to 256 and the output terminal 252 may be actually provided in the operation unit block 211.

In the present embodiment, the number of stages in which operations are performed in parallel in a space domain in the reservoir is represented by L. L represents an integer greater than or equal to 2.

i represents an integer greater than or equal to 1 and less than or equal to L as a variable.

k represents a value corresponding to time. In the present embodiment, k represents a discrete timing and represents an integer. In the present embodiment, it is assumed that the time passes as k increases and it is assumed that the time passes every time k is incremented by 1.

However, k may not represent the actual time, i.e., when operations are performed in parallel in a time domain in the reservoir, k does not necessarily represent the actual time. That is, the unit of time may be any unit.

A signal $x_i(k-1)$ is input to the input terminal 251. Here, it is assumed that the operation unit block 211 shown in FIG. 2 is a block of an $i^{th}$ stage. The signal $x_i(k-1)$ represents a signal output from the operation unit block 211 as a signal of time (k−1). That is, in the example of FIG. 2, a configuration in which the signal output from the operation unit block 211 is input to the operation unit block 211 again is adopted.

A signal $x_i(k)$ is output from the output terminal 252. The signal $x_i(k-1)$ represents a signal output from the operation unit block 211 as a signal of time (k−1). The signal $x_i(k)$ represents a signal output from the operation unit block 211 as a signal of time (k).

A signal u(k) is input to the input terminal 253. The signal u(k) represents a signal input to the reservoir as a signal of time (k).

A signal $\Sigma x_i(k-d)$ is input to the input terminal 254. Here, $\Sigma$ represents a sum of two or more predetermined values d. d represents an integer. That is, the signal $\Sigma x_i(k-d)$ represents a sum of signals of two or more different timings output from the operation unit block 211.

A signal $x_{i-m}(k-1)$ is input to the input terminal 255. The signal $x_{i-m}(k-1)$ represents a signal output from an operation unit block of an $(i-m)^{th}$ stage as a signal of time (k−1). m represents an integer and represents an integer greater than or equal to 1 and less than or equal to (i−1) in the present embodiment.

Here, although one input terminal 255 is shown in the example of FIG. 2, two or more input terminals may be provided in parallel, for example, when m is greater than or equal to 1 and less than or equal to (i−1).

In the example of FIG. 2, only one input terminal 255 is shown for simplification of illustration.

A signal $x_{i+n}(k-1)$ is input to the input terminal 256. The signal $x_{i+n}(k-1)$ represents a signal output from the operation unit block of an $(i+n)^{th}$ stage as a signal of time (k−1). n represents a natural number (including 0) in a broad sense and represents an integer greater than or equal to 0 and less than or equal to (L−i) in the present embodiment.

Here, in the example of FIG. 2, one input terminal 256 is shown. For example, when n is greater than or equal to 0 and less than or equal to (L−i), two or more input terminals may be provided in parallel.

In the example of FIG. 2, only one input terminal 256 is shown for simplification of illustration.

Here, relationships between signals input to the five input terminals 251 and 253 to 256 and a signal output from the one output terminal 252 are expressed by Eq. (1).

[Math. 1]

$$x_i(k) = \sum_m \beta_m x_{i-m}(k-1) + \sum_n \beta_n x_{i+n}(k-1) + \\ (1-\alpha)F_{NL}\left(x_i(k-1) + s_{i,d}\sum_d x_i(k-d) + J_i(k)\right) \quad (1)$$

In the operation unit block 211, the signal $x_i(k-1)$ input from the input terminal 251 is input to the adder 231.

In the operation unit block 211, a signal u(k) input from the input terminal 253 is converted into a signal $J_i(k)$ and the signal $J_i(k)$ is input to the adder 231. Here, the signal $J_i(k)$ is expressed by Eq. (2). That is, the signal $J_i(k)$ represents a result of multiplying the signal u(k) by a predetermined coefficient $w_{in,i}$. The predetermined coefficient $w_{in,i}$ may be any value or may be 0.

In the example of FIG. 2, the illustration is simplified and a multiplier for multiplying the predetermined coefficient $w_{in,i}$ is not shown in FIG. 2.

[Math. 2]

$$J_i(k) = w_{in,i} u(k) \quad (2)$$

In the operation unit block 211, the signal $\Sigma x_i(k-d)$ input from the input terminal 254 is multiplied by a predetermined coefficient $s_{i,d}$ and then a multiplication result is input to the adder 231. The predetermined coefficient $s_{i,d}$ may be any value or may be 0.

Also, in the example of FIG. 2, the illustration is simplified and a multiplier for multiplying the predetermined coefficient $s_{i,d}$ is not shown in FIG. 2.

In the operation unit block 211, a signal $x_{i-m}(k-1)$ input from the input terminal 255 is multiplied by a predetermined coefficient $\beta_m$ and a multiplication result is input to the adder 233. In the present embodiment, the multiplication result is input to the adder 233 with respect to one or more types of m.

Also, in the example of FIG. 2, the illustration is simplified and a multiplier for multiplying the predetermined coefficient $\beta_m$ is not shown in FIG. 2.

In the operation unit block 211, a signal $x_{i+n}(k-1)$ input from the input terminal 256 is multiplied by a predetermined coefficient $\beta_n$ and a multiplication result is input to the adder 233. In the present embodiment, the multiplication result is input to the adder 233 with respect to one or more types of n.

Also, in the example of FIG. 2, the illustration is simplified and a multiplier for multiplying the predetermined coefficient $\beta_n$ is not shown in FIG. 2.

The adder 231 performs an addition operation on a signal $x_i(k-1)$, a signal $J_i(k)$, and a signal $s_{i,d}\Sigma x_i(k-d)$, which are input signals, and outputs an addition operation result to the nonlinear operator 232.

The nonlinear operator 232 substitutes a signal input from the adder 231 into z of the predetermined nonlinear function $F_{NL}(z)$. Here, $F_{NL}(z)$ represents a nonlinear function with z as a variable. As the nonlinear function, for example, a sigmoid function, a hyperbolic tangent function, or the like may be used, without particular limitation.

The nonlinear operator 232 outputs an operation result of the nonlinear function $F_{NL}(z)$. The output operation result is multiplied by a predetermined coefficient (1−α) and a multiplication result is input to the adder 233. Here, a may be any value.

Also, in the example of FIG. 2, the illustration is simplified and a multiplier for multiplying the predetermined coefficient (1−α) is not shown in FIG. 2.

The adder 233 performs an addition operation on a signal $(1-\alpha)F_{NL}(z)$ which is the input signal, a sum of signals $\beta_m x_{i-m}(k-1)$ with respect to m, and a sum of signals $\beta_n x_{i+n}(k-1)$ with respect to n. An addition operation result is output to the output terminal 252. That is, the addition operation result is represented by Eq. (1).

Here, in the example of FIG. 2, m and n may be any integers. For example, m and n may be positive values, negative values, or 0. In this case, the side of the input terminal 255 and the side of the input terminal 256 can have substantially the same configuration.

On the other hand, the input signal $x_{i-m}(k-1)$ from the input terminal 255 and the input signal $x_{i+n}(k-1)$ from the input terminal 256 may have different configurations. For example, assuming that m and n have the same value and m and n are positive values, the input signal $x_{i-m}(k-1)$ and the input signal $x_{i+n}(k-1)$ are input as two spatially symmetric input signals to the adder 233.

Also, for example, a configuration in which the input terminals to the adder 233 are only the two input terminals 255 and 256 may be used.

Also, the adder 231, the nonlinear operator 232, and the adder 233 may be configured using any circuits.

Also, the coefficient $s_{i,d}$, the coefficient $w_{in,i}$, the coefficient $(1-\alpha)$, and the coefficients $\beta_m$ and $\beta_n$ serving as weights for the signal may be any values, for example, 1 or 0. When the coefficient serving as the weight for the signal is 1, the signal is not changed. When the coefficient serving as the weight for the signal is 0, this corresponds to a configuration in which no signal is used at a position of the weight.

Also, in the example of FIG. 2, at a position where the coefficient serving as the weight for the signal is not present, a configuration in which the coefficient serving as a weight is multiplied may be used as an example of another configuration.

Figure 3:
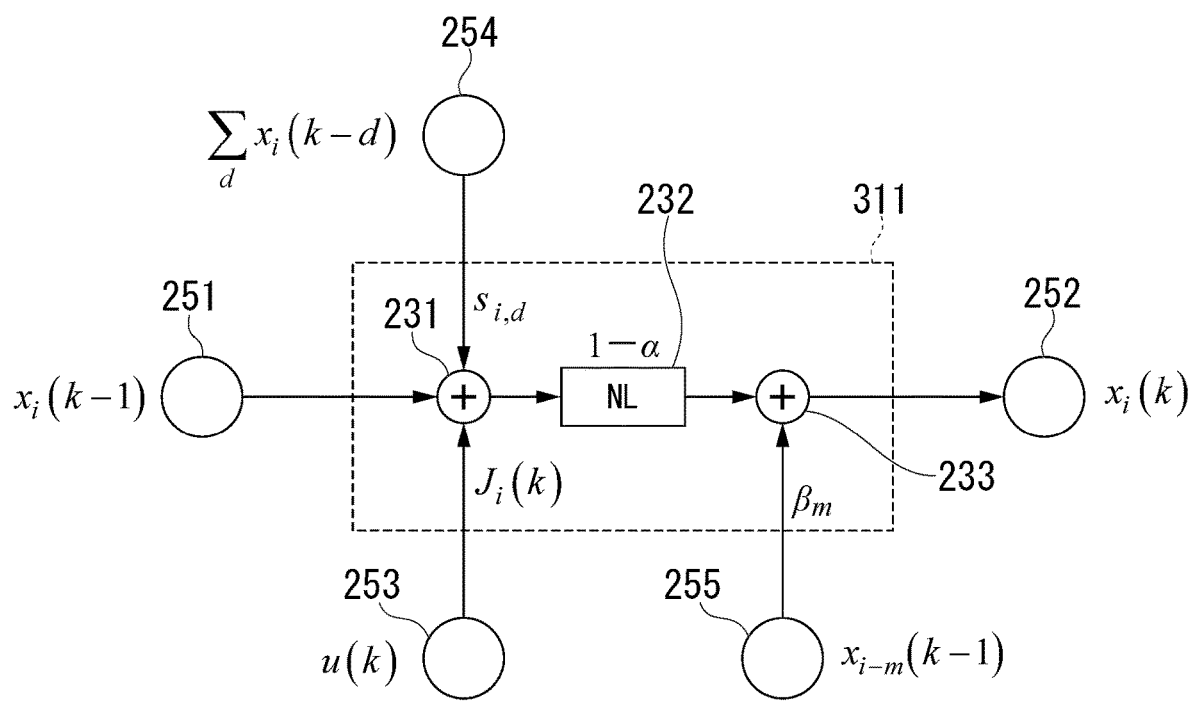
FIG. 3 is a diagram showing an example of an operation unit block according to the embodiment of the present disclosure.

FIG. 3 is a diagram showing an example of an operation unit block 311 according to the embodiment of the present disclosure.

In FIG. 3, for convenience of description, components similar to those shown in FIG. 2 are represented by the same reference signs and detailed description thereof will be omitted.

The operation unit block 311 includes an adder 231, a nonlinear operator 232, and an adder 233.

Also, in FIG. 3, four input terminals 251 and 253 to 255 to the operation unit block 311 and one output terminal 252 from the operation unit block 311 are shown.

Here, the operation unit block 311 is different from the operation unit block 211 shown in FIG. 2 in that a path from the input terminal 256 to the adder 233 is not provided and the operation unit block 311 is similar to the operation unit block 211 in other respects.

The signal output from the operation unit block 311 to the output terminal 252 is expressed by Eq. (3). That is, in the signal, there is no term corresponding to the above path.

[Math. 3]

$$x_i(k) = \sum_m \beta_m x_{i-m}(k-1) + (1-\alpha)F_{NL}\left(x_i(k-1) + s_{i,d}\sum_d x_i(k-d) + J_i(k)\right) \quad (3)$$

Here, in the example of FIG. 3, m may be any integer. For example, m may be a positive value, a negative value, or 0. In this case, the operation unit block 311 shown in FIG. 3 can have substantially the same configuration as the operation unit block 211 shown in FIG. 2.

On the other hand, for example, a configuration in which the input terminal to the adder 233 is only one input terminal 255 may be used.

Figure 4:
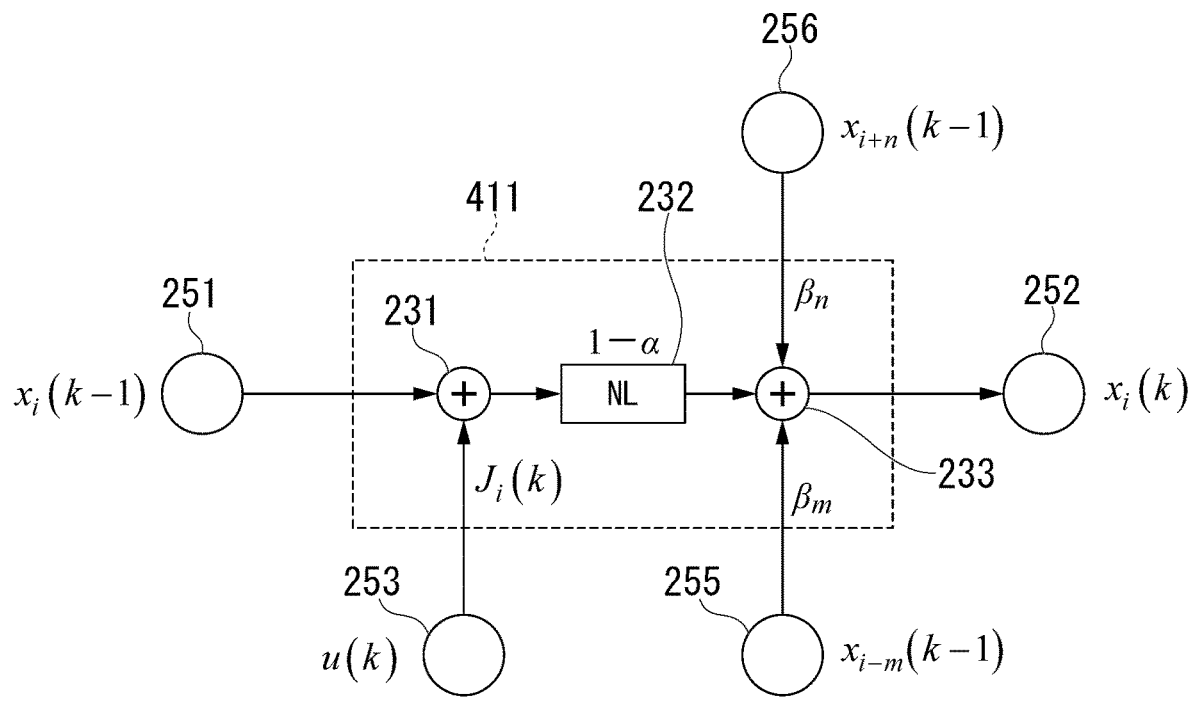
FIG. 4 is a diagram showing an example of an operation unit block according to the embodiment of the present disclosure.

FIG. 4 is a diagram showing an example of an operation unit block 411 according to the embodiment of the present disclosure.

In FIG. 4, for convenience of description, components similar to those shown in FIG. 2 are represented by the same reference signs and detailed description thereof will be omitted.

The operation unit block 411 includes an adder 231, a nonlinear operator 232, and an adder 233.

Also, in FIG. 4, four input terminals 251, 253, 255, and 256 to the operation unit block 411 and one output terminal 252 from the operation unit block 411 are shown.

Here, the operation unit block 411 is different from the operation unit block 211 shown in FIG. 2 in that a path from the input terminal 254 to the adder 231 is not provided and the operation unit block 411 is similar to the operation unit block 211 in other respects.

The signal output from the operation unit block 411 to the output terminal 252 is expressed by Eq. (4). That is, in the signal, there is no term corresponding to the above path.

[Math. 4]

$$x_i(k) = \sum_m \beta_m x_{i-m}(k-1) + \sum_n \beta_n x_{i+n}(k-1) + (1-\alpha)F_{NL}(x_i(k-1) + J_i(k)) \quad (4)$$

Figure 5:
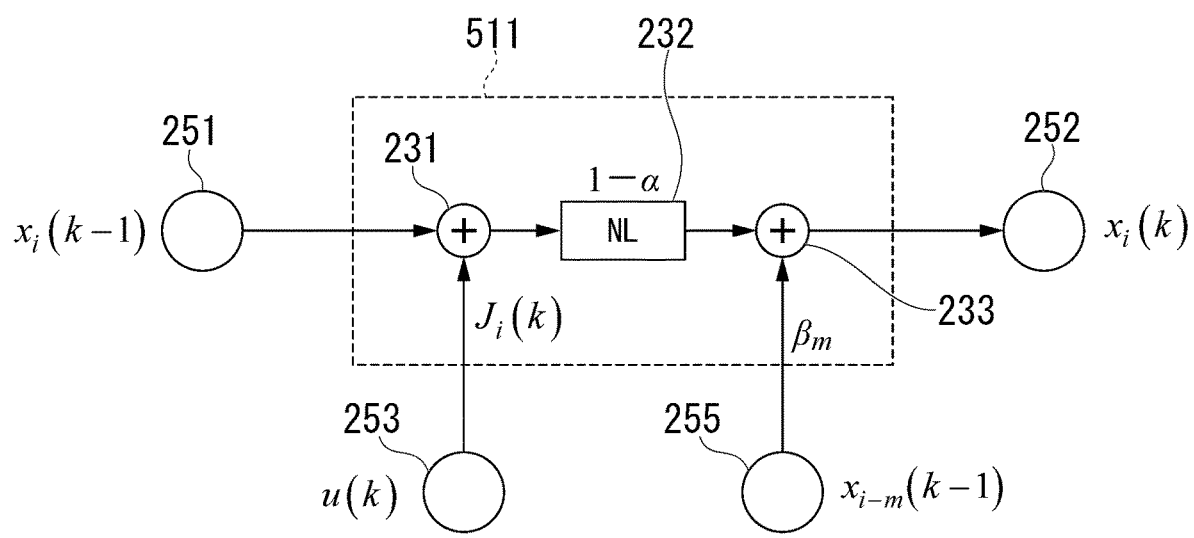
FIG. 5 is a diagram showing an example of an operation unit block according to the embodiment of the present disclosure.

FIG. 5 is a diagram showing an example of an operation unit block 511 according to the embodiment of the present disclosure.

In FIG. 5, for convenience of description, components similar to those shown in FIG. 2 are represented by the same reference signs and detailed description thereof will be omitted.

The operation unit block 511 includes an adder 231, a nonlinear operator 232, and an adder 233.

Also, in FIG. 5, four input terminals 251, 253, and 255 to the operation unit block 511 and one output terminal 252 from the operation unit block 511 are shown.

Here, the operation unit block 511 is different from the operation unit block 211 shown in FIG. 2 in that a path from the input terminal 254 to the adder 231 and a path from the input terminal 256 to the adder 233 are not provided and the operation unit block 511 is similar to the operation unit block 211 in other respects.

The signal output from the operation unit block 511 to the output terminal 252 is expressed by Eq. (5). That is, in the signal, there is no term corresponding to the above paths.

[Math. 5]

$$x_i(k) = \sum_m \beta_m x_{i-m}(k-1) + (1-\alpha)F_{NL}(x_i(k-1) + J_i(k)) \quad (5)$$

Here, as in the description of the relationship between the operation unit block 311 shown in FIG. 3 and the operation unit block 211 shown in FIG. 2, the operation unit block 511 shown in FIG. 5 can have a configuration substantially similar to that of the operation unit block 411 shown in FIG. 4 in relation to an input to the adder 233.

Also, for example, the array 21 of the reservoir computing data flow processor 1 may have a plurality of operation unit blocks capable of configuring (reconfiguring) any operation unit block among the operation unit blocks 211, 311, 411, and 511 shown in FIGS. 2 to 5. As such an operation unit block, for example, an operation unit block that can be configured as the operation unit block 211 shown in FIG. 2 may be used. That is, the operation unit block that can be configured as the operation unit block 211 shown in FIG. 2 can be configured as the operation unit blocks 311, 411, and 511 shown in FIGS. 3 to 5 by omitting the connection of some wiring elements.

Also, as another example, the array 21 may have any operation unit block as each of the plurality of operation unit blocks.

[Example of Configuration of Array]

An example of a configuration of the array 21 will be described with reference to FIGS. 6 to 11.

Also, for example, the configurations shown in FIGS. 6 to 11 may be used as the entire configuration of the array 21 or may be used as a partial configuration of the array 21.

Also, when a plurality of operation unit blocks are expanded and arranged in parallel in a spatial or time domain, the operation unit block arranged at the end such as the first stage in the spatial or time domain may have an input source or the like different from that of an operation unit block of another stage. For example, in a configuration in which an output from an operation unit block of another stage is input to a certain operation unit block in the spatial or time domain, another stage may be absent with respect to the operation unit block arranged at the end such as the first stage. In this case, an input terminal or the like for inputting an alternative signal may be provided. Also, an input signal from the input layer 41 may be given with a weight to the input terminal.

Figure 6:
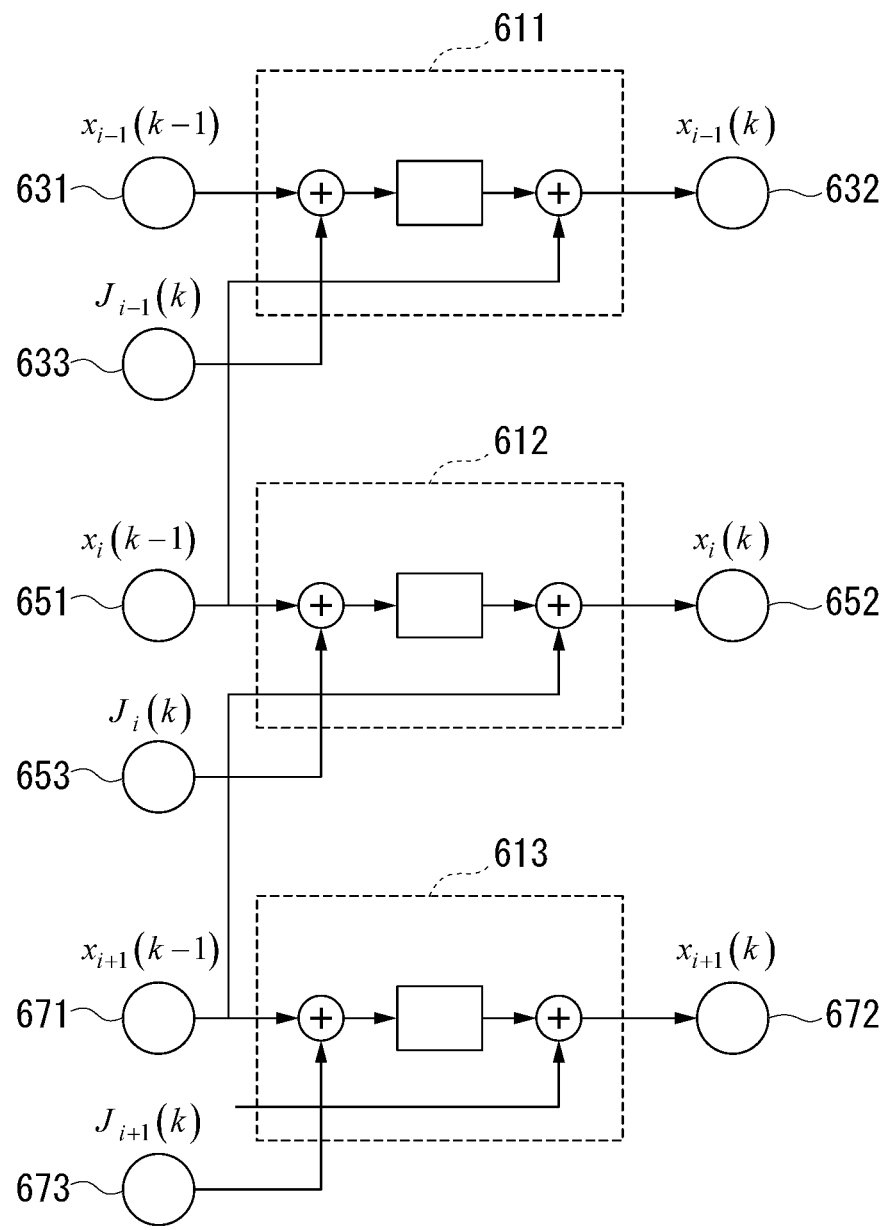
FIG. 6 is a diagram showing an example of a configuration of an array according to the embodiment of the present disclosure.

FIG. 6 is a diagram showing an example of a configuration of the array 21 according to the embodiment of the present disclosure.

In the example of FIG. 6, operation unit blocks 611 to 613 of three stages are provided in parallel in the spatial domain. In the example of FIG. 6, for convenience of description, the operation unit block 611 of an $(i-1)^{th}$ stage, the operation unit block 612 of an $i^{th}$ stage, and the operation unit block 613 of an $(i+1)^{th}$ stage are shown.

Each of the operation unit blocks 611 to 613 of the three stages is an operation unit block that performs an operation similar to that of the operation unit block 511 shown in FIG. 5.

In the operation unit blocks 611 to 613, input terminals 631, 651, and 671 correspond to the input terminal 251 shown in FIG. 5, input terminals 633, 653, and 673 correspond to the input terminal 253 shown in FIG. 5, and output terminals 632, 652, and 672 correspond to the output terminal 252 shown in FIG. 5. It is assumed that all the input terminals 631, 651, and 671, the input terminals 633, 653, and 673, and the output terminals 632, 652, and 672 are connected to the wiring of the CBs 111 to 116 and the IBs 121 to 128 shown in FIG. 1.

Also, in the operation unit block 612 of the $i^{th}$ stage, the input terminal 671 of the operation unit block 613 of the $(i+1)^{th}$ stage which is the next stage is used as the input terminal 255 shown in FIG. 5. That is, the input terminal 671 of the operation unit block 613 of the $(i+1)^{th}$ stage is shared between an input to the operation unit block 613 and an input to the operation unit block 612 of the previous stage. Thereby, the efficiency of the configuration in the spatial domain (the efficiency of the configuration in the direction of the number of stages in the present embodiment) is achieved.

Also, the same is true for other stages.

Here, although a configuration for three stages (the operation unit blocks 611 to 613) arranged in parallel in the spatial domain is shown in the example of FIG. 6, for example, a configuration for two stages arranged in parallel in the spatial domain may be used or a configuration for four or more stages arranged in parallel in the spatial domain may be used.

Also, although a configuration in which the input terminal of the operation unit block of a certain stage is used for an input to the operation unit block of the previous stage is shown in the example of FIG. 6, a configuration in which the input terminal of the operation unit block of a certain stage is used for an input to the operation unit block of the subsequent stage may be used as another example.

Figure 7:
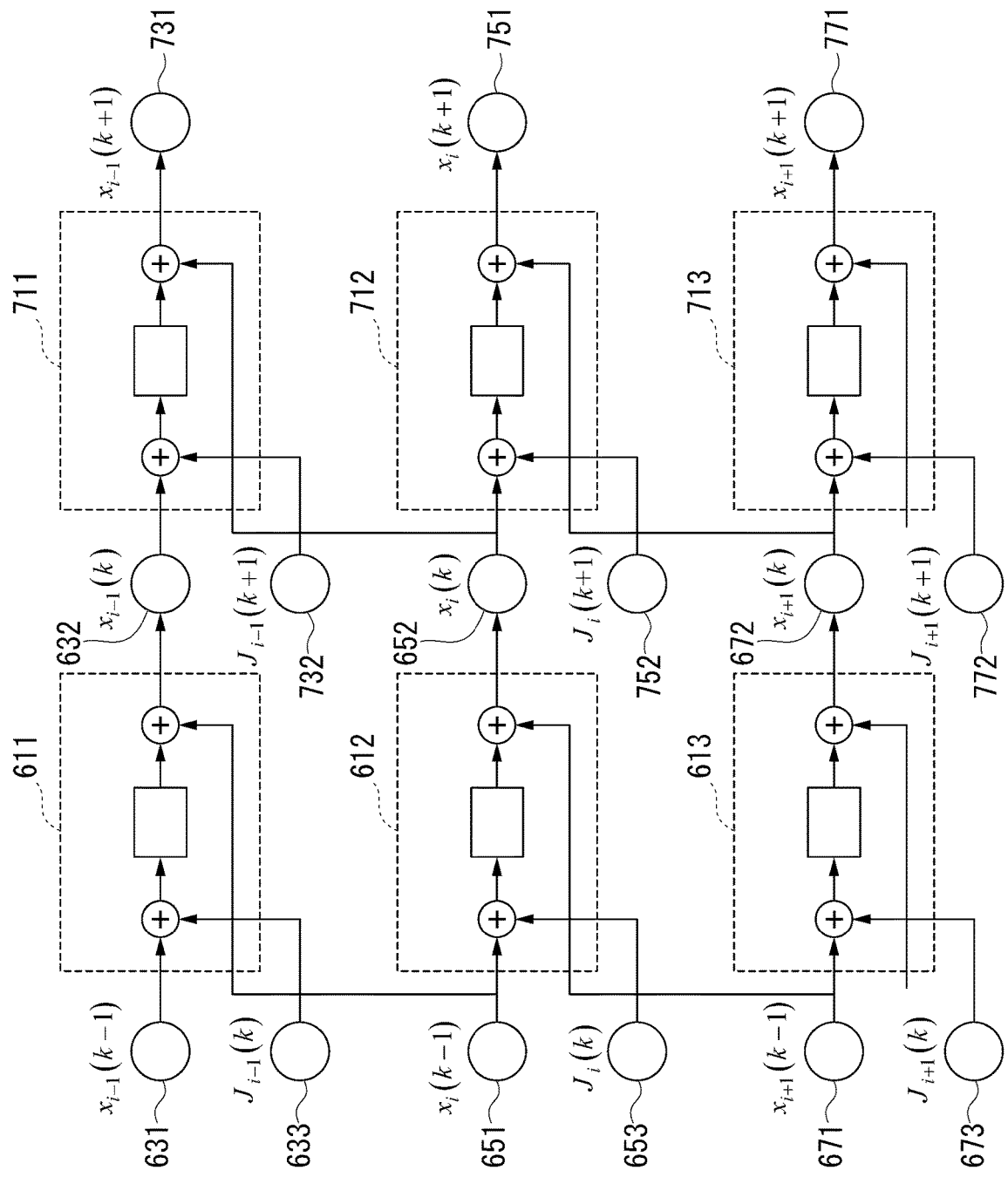
FIG. 7 is a diagram showing an example of a configuration of an array according to the embodiment of the present disclosure.

FIG. 7 is a diagram showing an example of a configuration of the array 21 according to the embodiment of the present disclosure.

Also, in the example of FIG. 7, for convenience of description, components similar to those shown in FIG. 6 are represented by the same reference signs.

In the example of FIG. 7, three operation unit blocks 611 to 613, input terminals 631, 651, and 671, input terminals 633, 653, and 673, and output terminals 632, 652, and 672 are similar to those shown in FIG. 6. It is assumed that all the input terminals 631, 651, and 671, the input terminals 633, 653, and 673, and the output terminals 632, 652, and 672 are connected to the wiring of the CBs 111 to 116 and the IBs 121 to 128 shown in FIG. 1.

In the example of FIG. 7, three operation unit blocks 711 to 713, which are components further expanded in the time domain, are provided as compared with the example of FIG. 6.

Each of the operation unit blocks 711 to 713 of the three stages is an operation unit block that performs an operation similar to that of the operation unit block 511 shown in FIG. 5.

In the operation unit blocks 711 to 713, input terminals 732, 752, and 772 correspond to the input terminal 253 shown in FIG. 5 and output terminals 731, 751, and 771 correspond to the output terminal 252 shown in FIG. 5. It is assumed that all the input terminals 732, 752, and 772 and the output terminals 731, 751, and 771 are connected to the wiring of the CBs 111 to 116 and the IBs 121 to 128 shown in FIG. 1.

Also, in the operation unit blocks 711 to 713, the output terminals 632, 652, and 672 of the operation unit blocks 611 to 613 present in the previous stage in the time domain are shared as input terminals corresponding to the input terminal 251 shown in FIG. 5. Thereby, the efficiency of the configuration in the time domain (the efficiency of a configuration in a time direction in the present embodiment) is achieved.

Figure 8:
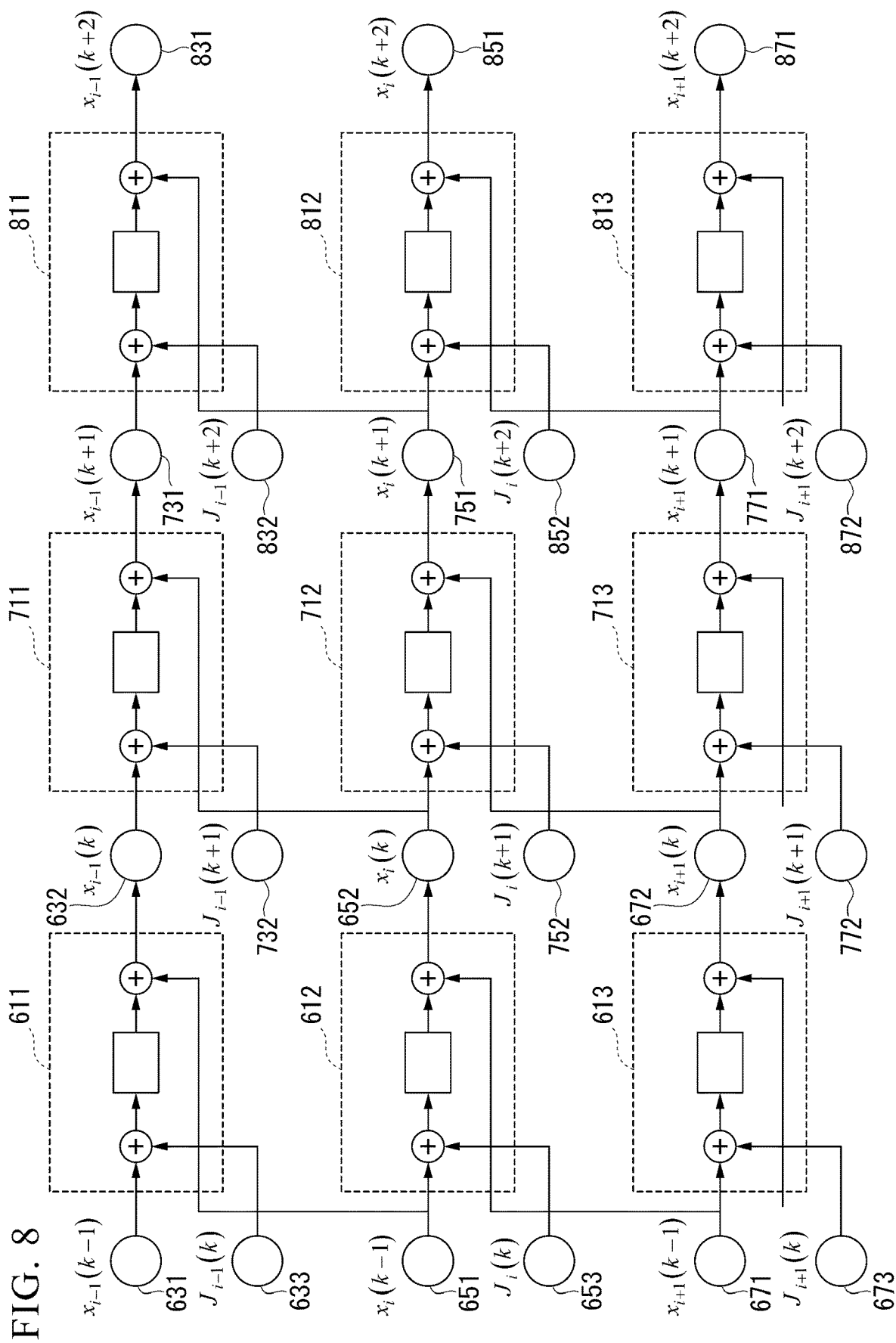
FIG. 8 is a diagram showing an example of a configuration of an array according to the embodiment of the present disclosure.

FIG. 8 is a diagram showing an example of a configuration of the array 21 according to the embodiment of the present disclosure.

In the example of FIG. 8, for convenience of description, components similar to those shown in FIG. 7 are represented by the same reference signs.

In the example of FIG. 8, three operation unit blocks 611 to 613, input terminals 631, 651, and 671, input terminals 633, 653, and 673, and output terminals 632, 652, and 672 are similar to those shown in FIG. 7.

Also, in the example of FIG. 8, three operation unit blocks 711 to 713, input terminals 732, 752, and 772, and output terminals 731, 751, and 771 are similar to those shown in FIG. 7.

In the example of FIG. 8, three operation unit blocks 811 to 813, which are components further expanded in the time domain, are provided as compared with the example of FIG. 7.

Each of the operation unit blocks 811 to 813 of the three stages is an operation unit block that performs an operation similar to the operation unit block 511 shown in FIG. 5.

In the operation unit blocks 811 to 813, input terminals 832, 852, and 872 correspond to the input terminal 253 shown in FIG. 5 and output terminals 831, 851, and 871 correspond to the output terminal 252 shown in FIG. 5. It is assumed that all the input terminals 832, 852, and 872 and the output terminals 831, 851, and 871 are connected to the wiring of the CBs 111 to 116 and the IBs 121 to 128 shown in FIG. 1.

Also, in the operation unit blocks 811 to 813, the output terminals 731, 751, and 771 of the operation unit blocks 711 to 713 present in the previous stage in the time domain are shared as input terminals corresponding to the input terminal 251 shown in FIG. 5. Thereby, the efficiency of the configuration in the time domain (the efficiency of data flow control in the time direction in the present embodiment) is achieved.

Here, although the configuration in which the operation unit blocks are provided in parallel in one to three stages in the time domain is shown in the examples of FIGS. 6 to 8, a configuration in which operation unit blocks of four or more stages are provided in parallel in the time domain may be used as another example.

Figure 9:
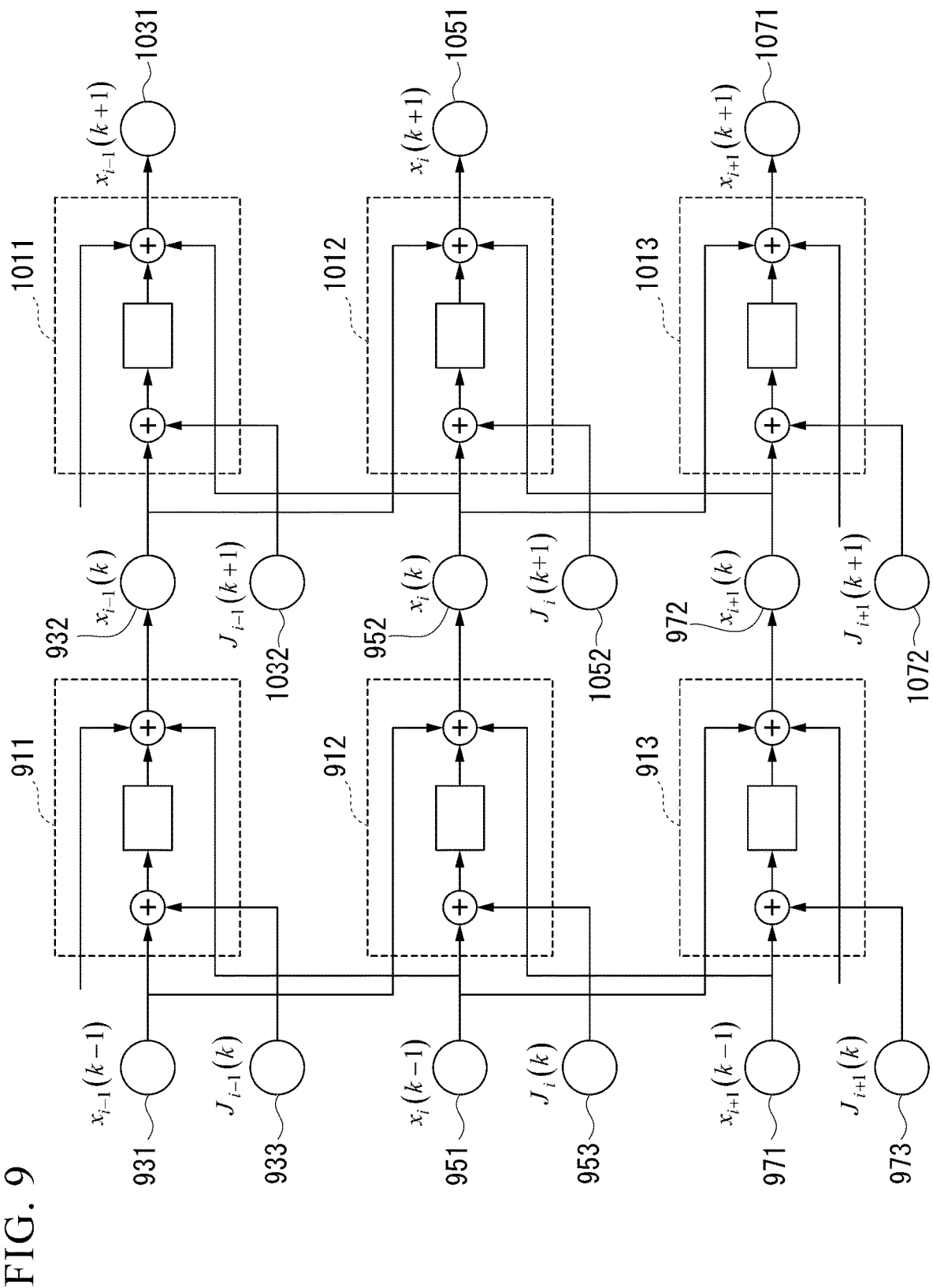
FIG. 9 is a diagram showing an example of a configuration of an array according to the embodiment of the present disclosure.

FIG. 9 is a diagram showing an example of a configuration of the array 21 according to the embodiment of the present disclosure.

In the example of FIG. 9, for a first stage in the time domain, operation unit blocks 911 to 913 of three stages are provided in parallel in the spatial domain. In the example of FIG. 9, for convenience of description, the operation unit block 911 of the $(i-1)^{th}$ stage, the operation unit block 912 of the $i^{th}$ stage, and the operation unit block 913 of the $(i+1)^{th}$ stage are shown.

Each of the operation unit blocks 911 to 913 of the three stages is an operation unit block that performs an operation similar to the operation unit block 411 shown in FIG. 4.

In the operation unit blocks 911 to 913, input terminals 931, 951, and 971 correspond to the input terminal 251 shown in FIG. 4, input terminals 933, 953, and 973 correspond to the input terminal 253 shown in FIG. 4, and output terminals 932, 952, and 972 correspond to the output terminal 252 shown in FIG. 4. It is assumed that all the input terminals 931, 951, and 971, the input terminals 933, 953, and 973, and the output terminals 932, 952, and 972 are connected to the wiring of the CBs 111 to 116 and the IBs 121 to 128 shown in FIG. 1.

Also, in the operation unit block 912 of the $i^{th}$ stage, the input terminal 971 of the operation unit block 913 of the $(i+1)^{th}$ stage which is the next stage is used as the input terminal 255 shown in FIG. 4. That is, the input terminal 971 of the operation unit block 913 of the $(i+1)^{th}$ stage is shared between an input to the operation unit block 913 and an input to the operation unit block 912 of the previous stage. Thereby, the efficiency of the configuration in the spatial domain (the efficiency of the data flow control in the direction of the number of stages in the present embodiment) is achieved.

Also, the same is true for other stages.

Also, in the operation unit block 912 of the $i^{th}$ stage, the input terminal 931 of the operation unit block 911 of the $(i-1)^{th}$ stage which is the previous stage is used as the input terminal 256 shown in FIG. 4. That is, the input terminal 931 of the operation unit block 911 of the $(i-1)^{th}$ stage is shared between an input to the operation unit block 911 and an input to the operation unit block 912 of the next stage. Thereby, the efficiency of the configuration in the spatial domain (the efficiency of data flow control in the direction of the number of stages in the present embodiment) can be achieved.

Also, the same is true for other stages.

For example, the input terminal 951 of the operation unit block 912 of the $i^{th}$ stage is used for an input to the operation unit block 912, an input to the operation unit block 911 of the $(i-1)^{th}$ stage which is the previous stage, and an input to the operation unit block 913 of the $(i+1)^{th}$ stage which is the next stage.

Here, although a configuration for three stages (the operation unit blocks 911 to 913) arranged in parallel in the spatial domain is shown in the example of FIG. 9, for example, a configuration for two stages arranged in parallel in the spatial domain may be used or a configuration for four or more stages arranged in parallel in the spatial domain may be used.

In the example of FIG. 9, three operation unit blocks 1011 to 1013, which are components further expanded in the time domain, are provided.

Each of the operation unit blocks 1011 to 1013 of the three stages is an operation unit block that performs an operation similar to that of the operation unit block 411 shown in FIG. 4.

In the operation unit blocks 1011 to 1013, input terminals 1032, 1052, and 1072 correspond to the input terminal 253 shown in FIG. 4 and output terminals 1031, 1051, and 1071 correspond to the output terminal 252 shown in FIG. 4. It is assumed that all the input terminals 1032, 1052, and 1072 and the output terminals 1031, 1051, and 1071 are connected to the wiring of the CBs 111 to 116 and the IBs 121 to 128 shown in FIG. 1.

Also, in the operation unit blocks 1011 to 1013, the output terminals 932, 952, and 972 of the operation unit blocks 911 to 913 present in the previous stage in the time domain are shared as the input terminal corresponding to the input terminal 251 shown in FIG. 4. Thereby, the efficiency of the configuration in the time domain (the efficiency of data flow control in the time direction in the present embodiment) is achieved.

Figure 10:
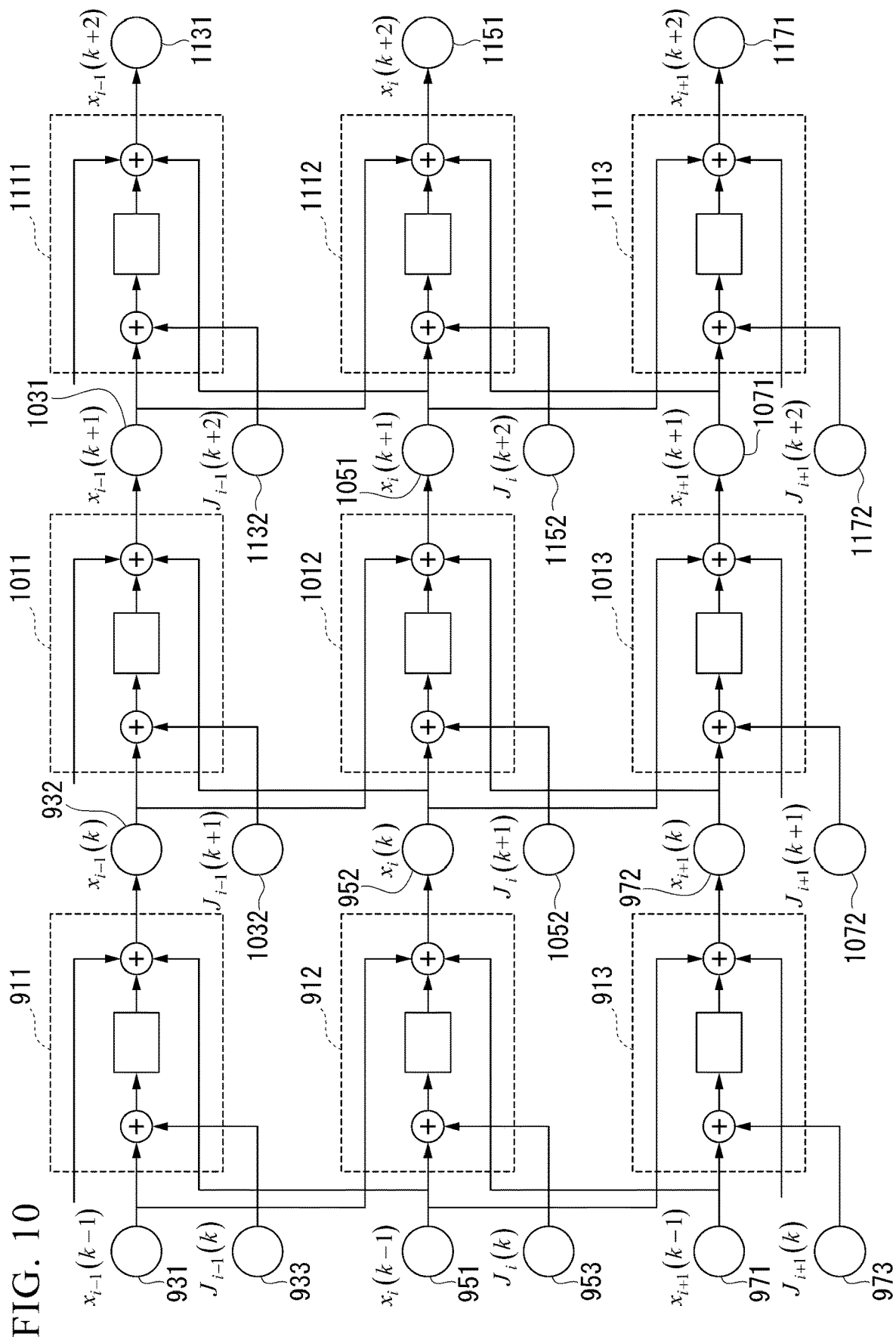
FIG. 10 is a diagram showing an example of a configuration of an array according to the embodiment of the present disclosure.

FIG. 10 is a diagram showing an example of a configuration of the array 21 according to the embodiment of the present disclosure.

Also, in the example of FIG. 10, for convenience of description, components similar to those of the components shown in FIG. 9 are represented by the same reference signs.

In the example of FIG. 10, three operation unit blocks 911 to 913, input terminals 931, 951, and 971, input terminals 933, 953, and 973, and output terminals 932, 952, and 972 are similar to those shown in FIG. 9.

Also, in the example of FIG. 10, three operation unit blocks 1011 to 1013, input terminals 1032, 1052, and 1072, and output terminals 1031, 1051, and 1071 are similar to those shown in FIG. 9. It is assumed that all the input terminals 1032, 1052, and 1072 and the output terminals 1031, 1051, and 1071 are connected to the wiring of the CBs 111 to 116 and the IBs 121 to 128 shown in FIG. 1.

In the example of FIG. 10, three operation unit blocks 1111 to 1113, which are components further expanded in the time domain, are provided as compared with the example of FIG. 9.

Each of the operation unit blocks 1111 to 1113 of the three stages is an operation unit block that performs an operation similar to that of the operation unit block 411 shown in FIG. 4.

In the operation unit blocks 1111 to 1113, the input terminals 1132, 1152, and 1172 correspond to the input terminal 253 shown in FIG. 4 and the output terminals 1131, 1151, and 1171 correspond to the output terminal 252 shown in FIG. 4. It is assumed that all the input terminals 1132, 1152, and 1172 and the output terminals 1131, 1151, and 1171 are connected to the wiring of the CBs 111 to 116 and the IBs 121 to 128 shown in FIG. 1.

Also, in the operation unit blocks 1111 to 1113, the output terminals 1031, 1051, and 1071 of the operation unit blocks 1011 to 1013 present in the previous stage in the time domain are shared as input terminals corresponding to the input terminal 251 shown in FIG. 4. Thereby, the efficiency of the configuration in the time domain (the efficiency of data flow control in the time direction in the present embodiment) is achieved.

Here, although a configuration in which the operation unit blocks are provided in parallel in the two stages and the three stages in the time domain is shown in the examples of FIGS. 9 and 10, a configuration in which operation unit blocks are provided in one stage in the time domain or a configuration in which operation unit blocks are provided in parallel in four or more stages in the time domain may be used as another example.

Figure 11:
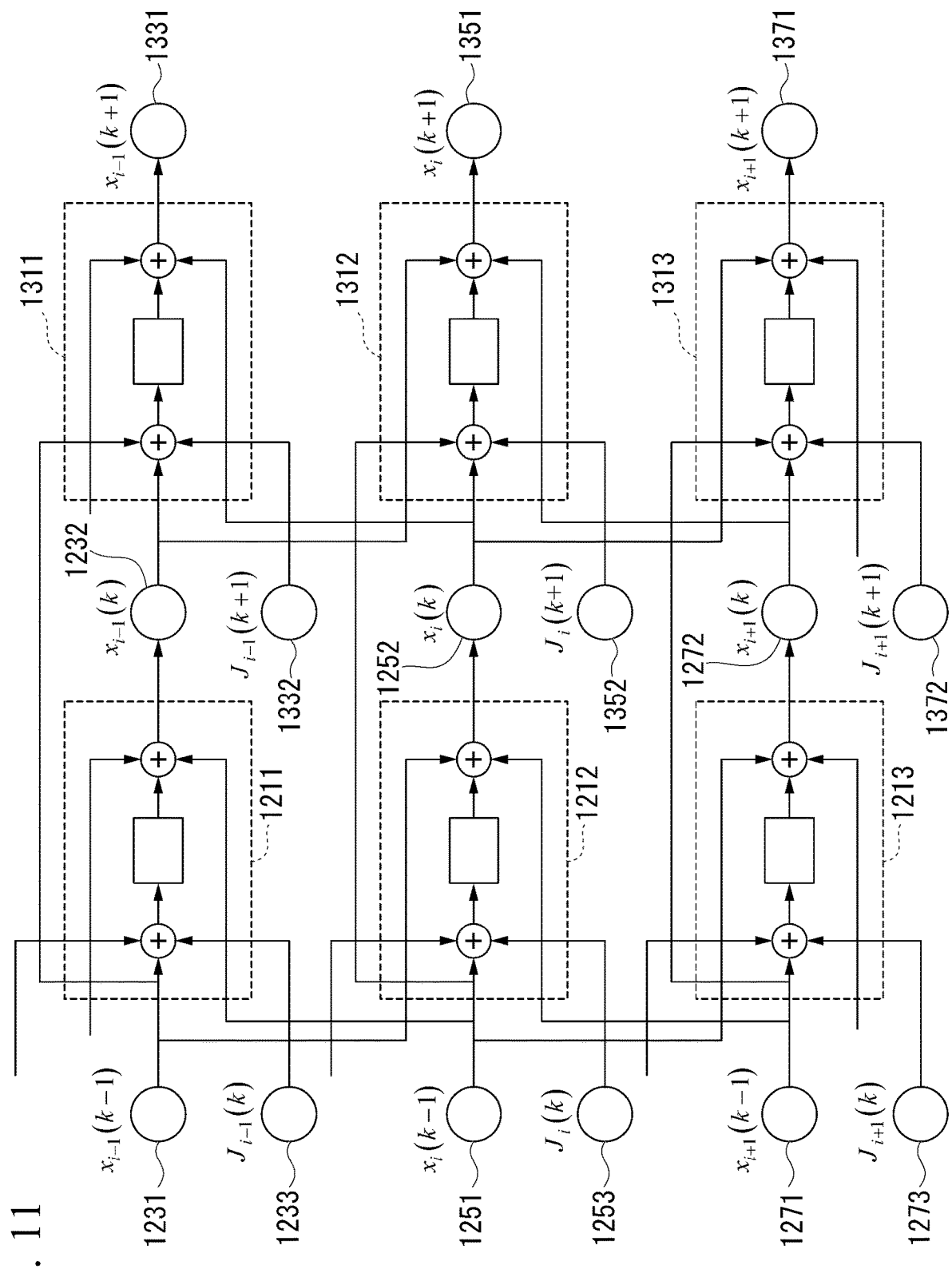
FIG. 11 is a diagram showing an example of a configuration of an array according to the embodiment of the present disclosure.

FIG. 11 is a diagram showing an example of a configuration of the array 21 according to the embodiment of the present disclosure.

In the example of FIG. 11, for a first stage in the time domain, operation unit blocks 1211 to 1213 of three stages are provided in parallel in the spatial domain. In the example of FIG. 11, for convenience of description, the operation unit block 1211 of the $(i-1)^{th}$ stage, the operation unit block 1212 of the $i^{th}$ stage, and the operation unit block 1213 of the $(i+1)^{th}$ stage are shown.

Each of the operation unit blocks 1211 to 1213 of the three stages is an operation unit block that performs an operation similar to that of the operation unit block 211 shown in FIG. 2.

In the operation unit blocks 1211 to 1213, input terminals 1231, 1251, and 1271 correspond to the input terminal 251 shown in FIG. 2, input terminals 1233, 1253, and 1273 correspond to the input terminal 253 shown in FIG. 2, and output terminals 1232, 1252, and 1272 correspond to the output terminal 252 shown in FIG. 2. It is assumed that all the input terminals 1231, 1251, and 1271, the input terminals 1233, 1253, and 1273, and the output terminals 1232, 1252, and 1272 are connected to the wiring of the CBs 111 to 116 and the IBs 121 to 128 shown in FIG. 1.

Also, in the operation unit block 1212 of the $i^{th}$ stage, the input terminal 1271 of the operation unit block 1213 of the $(i+1)^{th}$ stage which is the next stage is used as the input terminal 255 shown in FIG. 2. That is, the input terminal 1271 of the operation unit block 1213 of the $(i+1)^{th}$ stage is shared between an input to the operation unit block 1213 and an input to the operation unit block 1212 of the previous stage. Thereby, the efficiency of the configuration in the spatial domain (the efficiency of data flow control in the direction of the number of stages in the present embodiment) can be achieved. Also, the same is true for other stages.

Also, in the operation unit block 1212 of the $i^{th}$ stage, the input terminal 1231 of the operation unit block 1211 of the $(i-1)^{th}$ stage which is the previous stage is used as the input terminal 256 shown in FIG. 2. That is, the input terminal 1231 of the operation unit block 1211 of the $(i-1)^{th}$ stage is shared between an input to the operation unit block 1211 and an input to the operation unit block 1212 of the next stage. Thereby, the efficiency of the configuration in the spatial domain (the efficiency of data flow control in the direction of the number of stages in the present embodiment) can be achieved.

Also, the same is true for other stages.

For example, the input terminal 1251 of the operation unit block 1212 of the $i^{th}$ stage is used for an input to the operation unit block 1212, an input to the operation unit block 1211 of the $(i-1)^{th}$ stage which is the previous stage, and an input to the operation unit block 1213 of the $(i+1)^{th}$ stage which is the next stage.

Here, although a configuration for three stages (the operation unit blocks 1211 to 1213) arranged in parallel in the spatial domain is shown in the example of FIG. 11, for example, a configuration for two stages arranged in parallel in the spatial domain may be used or a configuration for four or more stages arranged in parallel in the spatial domain may be used.

In the example of FIG. 11, three operation unit blocks 1311 to 1313, which are components further expanded in the time domain, are provided.

Each of the operation unit blocks 1311 to 1313 of the three stages is an operation unit block that performs an operation similar to the operation unit block 211 shown in FIG. 2.

In the operation unit blocks 1311 to 1313, input terminals 1332, 1352, and 1372 correspond to the input terminal 253 shown in FIG. 2 and output terminals 1331, 1351, and 1371 correspond to the output terminal 252 shown in FIG. 2. It is assumed that all the input terminals 1332, 1352, and 1372 and the output terminals 1331, 1351, and 1371 are connected to the wiring of the CBs 111 to 116 and the IBs 121 to 128 shown in FIG. 1.

Also, in the operation unit blocks 1311 to 1313, the output terminals 1232, 1252, 1272 of the operation unit blocks 1211 to 1213 present in the previous stage in the time domain are shared as input terminals corresponding to the input terminal 251 shown in FIG. 2. Thereby, the efficiency of the configuration in the time domain (the efficiency of data flow control in the time direction in the present embodiment) is achieved.

Also, in the operation unit blocks 1311 to 1313, the input terminals 1231, 1251, and 1271 of the operation unit blocks 1211 to 1213 present in the previous stage in the time domain are shared as input terminals corresponding to the input terminal 254 shown in FIG. 2. Thereby, the efficiency of the configuration in the time domain (the efficiency of data flow control in the time direction in the present embodiment) is achieved.

For example, the input terminal 1251 of the operation unit block 1212 of the $i^{th}$ stage is used for an input to the operation unit block 1212 and an input to the operation unit block 1312 of the next stage in the time domain.

Here, although a configuration in which the operation unit blocks are provided in parallel in the two stages in the time domain is shown in the examples of FIG. 11, a configuration in which operation unit blocks are provided in one stage in the time domain or a configuration in which operation unit blocks are provided in parallel in three or more stages in the time domain may be used as another example.

[Regarding Above-Described Embodiments]

The reservoir computing data flow processor 1 according to the present embodiment includes a reconfigurable machine learning device to physically implement a reservoir computing having a function of generating, predicting, identifying, or detecting a time series signal. The reservoir computing data flow processor 1 according to the present embodiment includes an operation unit block which is a minimum constituent unit of a reservoir that performs a predetermined operation and generates and retains (buffers) time series information as the machine learning device. In the present embodiment, the operation unit block becomes a reservoir unit of the minimum unit constituting the reservoir.

Therefore, for example, the reservoir computing data flow processor 1 according to the present embodiment can provide hardware that executes reservoir computing for a time series signal in real time.

In the reservoir computing data flow processor 1 according to the present embodiment, when the number of stages of the operation unit block is small in the spatial or time domain, the power consumption is small and the overall processing time is long. On the other hand, in the reservoir computing data flow processor 1 according to the present embodiment, when the number of stages of the operation unit blocks is large in the spatial or time domain, the power consumption is large and the overall processing time is short. For example, by adjusting these trade-offs, it is possible to improve the performance of the device.

For example, the reservoir computing data flow processor 1 according to the present embodiment can provide a dedicated device for achieving the efficiency of the data flow and optimizing the throughput in implementing the reservoir computing function.

In the reservoir computing data flow processor 1 according to the present embodiment, for example, by deriving a mathematically equivalent DFG at the time of design, a reservoir of any scale and various network configurations can be implemented.

Also, in the reservoir computing data flow processor 1 according to the present embodiment, for example, it is possible to flexibly cope with the expansion of an operation equation of a mathematical model of an implementation target. For example, the embodiments of FIGS. 7 to 8 correspond to the mathematical model proposed in Non-Patent Document 1, and the embodiments of FIGS. 9 to 10 correspond to one of the mathematical models proposed in Non-Patent Document 2. The embodiment of FIG. 11 corresponds to one of the mathematical models proposed in Non-Patent Document 3.

Also, in the reservoir computing data flow processor 1 according to the present embodiment, for example, an in-memory computing architecture effectively equipped with a non-volatile memory (NVM) can be implemented. Also, for example, it can be implemented as an optical waveguide device by implementing a nonlinear operation function of an optical modulator and a DFG on an optical waveguide.

In the reservoir computing data flow processor 1 according to the present embodiment, the parameters and the network configuration can be changed in a programmable manner.

Therefore, in the reservoir computing data flow processor 1 according to the present embodiment, the parameters and the network configuration can be changed as a module configuration in a programmable manner, for example, so that a designer (an example of a user) can easily change the configuration of the reservoir for a specific purpose to achieve customized physical implementation.

For example, in the reservoir computing data flow processor 1 according to the present embodiment, when the reservoir is implemented, the reservoir is mathematically associated with the reservoir having a one-dimensional ring topology configuration, so that a specific architecture and parameters can be determined theoretically and systematically.

The reservoir computing data flow processor 1 according to the present embodiment generates a first intermediate signal (a signal input to the nonlinear operator 232 in the present embodiment) by receiving a resulting signal obtained by multiplying the input signal (the signal u(k) in the present embodiment) by a weight and adding the signal to a state value internally retained in the previous time step or in the time step before the previous time step. Also, the reservoir computing data flow processor 1 according to the present embodiment generates a second intermediate signal (a signal output from the nonlinear operator 232 in the present embodiment) by performing nonlinear conversion on the first intermediate signal. Also, in the reservoir computing data flow processor 1 according to the present embodiment, for example, a signal from an adjacent module is received, an interaction term obtained by multiplying the signal by a weight is calculated, and the interaction term is added to the second intermediate signal, so that an output signal (the signal $x_i(k)$ in the present embodiment) is generated as a state value at the next time step.

Therefore, in the reservoir computing data flow processor 1 according to the present embodiment, the minimum constituent unit of the reservoir that generates and retains the time series information can be specifically implemented in the reservoir computing.

In the reservoir computing data flow processor 1 according to the present embodiment, representation is made by a DFG using the minimum constituent unit.

Therefore, in the reservoir computing data flow processor 1 according to the present embodiment, it is possible to easily design a constituent unit for implementing a reservoir layer using a wide variety of devices, for example, digital hardware devices, such as an FPGA and an ASIC.

For example, when the reservoir computing data flow processor 1 according to the present embodiment is implemented on an FPGA, an ASIC, or the like, it is possible to implement efficient computing resources and implement hardware that performs efficient data flow control (not a control flow).

In the reservoir computing data flow processor 1 according to the present embodiment, it is possible to implement a network configuration having any scale and various two-dimensional topologies by combining a plurality of machine learning devices. Also, in the reservoir computing data flow processor 1 according to the present embodiment, the reservoir having such a network configuration can be graphically represented through data flow representation. Therefore, in the present embodiment, a device operation can be systematically analyzed and taken into account in the design on the basis of the data flow representation.

In the reservoir computing data flow processor 1 according to the present embodiment, machine learning devices can be integrated and implemented, and for example, a network configuration corresponding to an expansion model of reservoir computing can be implemented.

Therefore, in the reservoir computing data flow processor 1 according to the present embodiment, for example, the reservoir layer can be implemented on an FPGA, an ASIC, or the like on the basis of different expansion models.

In the present embodiment, it is possible to theoretically derive a DFG for converting sequential operations executed by virtual nodes in a time-division manner into parallel and distributed operations through physical nodes arranged in the spatial domain and provide the reservoir computing data flow processor 1 as the physical implementation thereof. In the present embodiment, because the reservoir configuration (coupling structure) can be made only by adjacent coupling by the derived data flow graph representation, the efficiency of the data flow control can be achieved and problems (scalability and variation in wiring delay) due to the complexity of wiring can be solved.

<Examples of Configuration>

As an example of the configuration, the reservoir computing data flow processor (the reservoir computing data flow processor 1 in the example of FIG. 1) includes a plurality of reservoir units (DRUs in the example of FIG. 1) to be units constituting the reservoir.

The reservoir can be reconfigured by a plurality of reservoir units by changing a connection relationship between the reservoir units.

Each of the reservoir units is an operation unit block that executes a predetermined operation and includes an operation circuit (an operation circuit of a DRU in the example of FIG. 1).

The operation unit block includes a first adder (the adder 231 in the examples of FIGS. 2 to 5) configured to perform an addition operation on at least two inputs, a nonlinear operator (the nonlinear operator 232 in the examples of FIGS. 2 to 5) configured to apply a nonlinear function to an output from the first adder or a result of multiplying the output by a predetermined coefficient (an example in which the predetermined coefficient is absent in the examples of FIGS. 2 to 5), and a second adder (the adder 233 in FIGS. 2 to 5) configured to perform an addition operation on at least two inputs including an output from the nonlinear operator or a result of multiplying the output by a predetermined coefficient (a result of multiplying the output by the predetermined coefficient in the examples of FIGS. 2 to 5).

As an example of the configuration, in the reservoir computing data flow processor, a first block configured to connect the reservoir units (the CBs 111 to 116 in the example of FIG. 1), a second block configured to perform input and output processes (the IBs 121 to 128 in the example of FIG. 1), and a data flow controller (the data flow controller 22 in the example of FIG. 1) configured to change a data flow by switching the connection relationship between the reservoir units on the basis of data flow representation of a mathematical model of a reservoir are further provided.

As an example of the configuration, in the reservoir computing data flow processor, the reservoir is able to be reconfigured in a programmable manner (i.e., programmable).

As an example of the configuration, in the reservoir computing data flow processor, the reservoir is able to be reconfigured on the basis of predetermined information in accordance with a desirable data flow graph (reconfiguration is performed by the data flow controller 22 in the example of FIG. 1).

As an example of the configuration, in the reservoir computing data flow processor, a plurality of operation unit blocks are arranged in parallel in a space domain. Thereby, for example, it is possible to process a plurality of signals at the same time in parallel.

As an example of the configuration, in the reservoir computing data flow processor, a plurality of operation unit blocks are arranged in parallel in a time domain. Thereby, for example, it is possible to process a plurality of signals at different times in the same stage in parallel in the space domain.

As an example of the configuration, in the reservoir computing data flow processor, the first adder performs an addition operation at least on: a signal corresponding to an output signal from the second adder of a previous time (i.e., a time corresponding to the past) or a result of multiplying the signal by a predetermined coefficient; and an input signal of the reservoir or a result of multiplying the input signal by a predetermined coefficient (for example, the examples of FIGS. 2 to 5).

As an example of the configuration, in the reservoir computing data flow processor, the second adder performs an addition operation at least on: an output from the nonlinear operator or a result of multiplying the output by a predetermined coefficient; and a signal corresponding to an output signal from the second adder of another stage among a plurality of stages arranged in parallel in a space domain or a result of multiplying the signal by a predetermined coefficient.

Also, a program for implementing the function of any component of any device such as the above-described reservoir computing data flow processor may be recorded on a computer-readable recording medium and the program may be read and executed by a computer system. Also, it is assumed that the "computer system" used here includes an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system.

Furthermore, the "computer-readable recording medium" is assumed to include a medium that retains a program for a certain period of time, such as a volatile memory inside a computer system serving as a server or a client when the program is transmitted via a network such as the Internet or a communication circuit such as a telephone circuit. For example, the volatile memory may be a random-access memory (RAM). For example, the recording medium may be a non-transitory recording medium.

Also, the above-described program may be transmitted from a computer system storing the program in a storage device or the like to another computer system via a transmission medium or by transmission waves in a transmission medium. Here, the "transmission medium" for transmitting the program refers to a medium having a function of transmitting information, as in a network such as the Internet or a communication circuit such as a telephone circuit.

Also, the above-described program may be a program for implementing some of the above-described functions. Further, the above-described program may be a so-called differential file capable of implementing the above-described function in combination with a program already recorded on the computer system. The differential file may be referred to as a differential program.

Also, a function of any component of any device such as the above-described reservoir computing data flow processor may be implemented on a microprocessor. For example, each process in the present embodiment may be implemented by a microprocessor that operates on the basis of information such as a program and a computer-readable recording medium that stores information such as a program. Here, in the microprocessor, for example, the function of each part may be implemented by individual hardware or the function of each part may be implemented by integrated hardware. For example, the microprocessor may include hardware and the hardware may include at least one of a circuit that processes a digital signal and a circuit that processes an analog signal. For example, the microprocessor may be configured using one or more circuit devices or/and one or more circuit elements implemented on a circuit board. An integrated circuit (IC) or the like may be used as the circuit device and a resistor, a capacitor, or the like may be used as the circuit element.

Here, for example, the reservoir computing data flow processor may be implemented using various types of digital processors such as a CPU, a graphics processing unit (GPU), and a digital signal processor (DSP) on the basis of data flow representation of the mathematical model of the reservoir shown in the embodiment of the present disclosure. Also, the reservoir computing data flow processor may be, for example, a hardware circuit based on an FPGA. Also, for example, the reservoir computing data flow processor may include a plurality of CPUs, a plurality of FPGAs, or a hardware circuit based on a plurality of ASICs. Also, for example, the reservoir computing data flow processor may include a combination of a plurality of CPUs and a hardware circuit based on a plurality of ASICs. Also, for example, the reservoir computing data flow processor may include one or more of an amplifier circuit and a filter circuit for processing an analog signal.

Although embodiments of the present disclosure have been described above with reference to the drawings, specific configurations are not limited to the embodiments, and other designs and the like may also be included without departing from the scope of the present disclosure.

INDUSTRIAL APPLICABILITY

According to a reservoir computing data flow processor of the present disclosure, it is possible to provide a dedicated device for reservoir computing suitable for configuring a reservoir.

REFERENCE SIGNS LIST

1 Reservoir computing data flow processor
21 Array
22 Data flow controller
23 Shared storage
41 Input layer
42 Output layer
51(i, j) DRU
52, 53 Connector
111 to 116 CB
121 to 128 IB
211, 311, 411, 511, 611 to 613, 711 to 713, 811 to 813, 911 to 913, 1011 to 1013, 1111 to 1113, 1211 to 1213, 1311 to 1313 Operation unit block
231, 233 Adder
232 Nonlinear operator
251, 253 to 256, 631, 633, 651, 653, 671, 673, 732, 752, 772, 832, 852, 872, 931, 933, 951, 953, 971, 973, 1032, 1052, 1072, 1132, 1152, 1172, 1231, 1233, 1251, 1253, 1271, 1273, 1332, 1352, 1372 Input terminal
252, 632, 652, 672, 731, 751, 771, 831, 851, 871, 932, 952, 972, 1031, 1051, 1071, 1131, 1151, 1171, 1232, 1252, 1272, 1331, 1351, 1371 Output terminal

What is claimed is:

1. A reservoir computing data flow processor comprising:
a plurality of reservoir units to be units constituting a reservoir,
wherein the reservoir is able to be reconfigured by changing a connection relationship between the reservoir units,
wherein each of the reservoir units is an operation unit block configured to execute a predetermined operation, and
wherein the operation unit block includes a first adder configured to perform an addition operation on at least two inputs, a nonlinear operator configured to apply a nonlinear function to an output from the first adder or a result of multiplying the output by a predetermined coefficient, and a second adder configured to perform an addition operation on at least two inputs including an output from the nonlinear operator or a result of multiplying the output by a predetermined coefficient.

2. The reservoir computing data flow processor according to claim 1, wherein the second adder is configured to perform an addition operation at least on: an output from the nonlinear operator or a result of multiplying the output by a predetermined coefficient; and a signal corresponding to an output signal from the second adder of another stage among a plurality of stages arranged in parallel in a space domain or a result of multiplying the signal by a predetermined coefficient.

3. The reservoir computing data flow processor according to claim 1, further comprising:
a first block configured to connect the reservoir units;
a second block configured to perform input and output processes; and
a data flow controller configured to change a data flow by switching the connection relationship between the reservoir units on a basis of data flow representation of a mathematical model of a reservoir.

4. The reservoir computing data flow processor according to claim 2, further comprising:
a first block configured to connect the reservoir units;
a second block configured to perform input and output processes; and
a data flow controller configured to change a data flow by switching the connection relationship between the reservoir units on a basis of data flow representation of a mathematical model of a reservoir.

5. The reservoir computing data flow processor according to claim 1, wherein the reservoir is able to be reconfigured in a programmable manner.

6. The reservoir computing data flow processor according to claim 2, wherein the reservoir is able to be reconfigured in a programmable manner.

7. The reservoir computing data flow processor according to claim 3, wherein the reservoir is able to be reconfigured in a programmable manner.

8. The reservoir computing data flow processor according to claim 4, wherein the reservoir is able to be reconfigured in a programmable manner.

9. The reservoir computing data flow processor according to claim 1, wherein the reservoir is able to be reconfigured on a basis of predetermined information in accordance with a desirable data flow graph.

10. The reservoir computing data flow processor according to claim 2, wherein the reservoir is able to be reconfigured on a basis of predetermined information in accordance with a desirable data flow graph.

11. The reservoir computing data flow processor according to claim 3, wherein the reservoir is able to be reconfigured on a basis of predetermined information in accordance with a desirable data flow graph.

12. The reservoir computing data flow processor according to claim 4, wherein the reservoir is able to be reconfigured on a basis of predetermined information in accordance with a desirable data flow graph.

13. The reservoir computing data flow processor according to claim 5, wherein the reservoir is able to be reconfigured on a basis of predetermined information in accordance with a desirable data flow graph.

14. The reservoir computing data flow processor according to claim 6, wherein the reservoir is able to be reconfigured on a basis of predetermined information in accordance with a desirable data flow graph.

15. The reservoir computing data flow processor according to claim 7, wherein the reservoir is able to be reconfigured on a basis of predetermined information in accordance with a desirable data flow graph.

16. The reservoir computing data flow processor according to claim 8, wherein the reservoir is able to be reconfigured on a basis of predetermined information in accordance with a desirable data flow graph.

17. The reservoir computing data flow processor according to claim 1, wherein a plurality of operation unit blocks are arranged in parallel in a space domain.

18. The reservoir computing data flow processor according to claim 2, wherein a plurality of operation unit blocks are arranged in parallel in a space domain.

19. The reservoir computing data flow processor according to claim 1, wherein a plurality of operation unit blocks are arranged in parallel in a time domain.

20. The reservoir computing data flow processor according to claim 1, wherein the first adder is configured to perform an addition operation at least on: a signal corresponding to an output signal from the second adder of a previous time or a result of multiplying the signal by a predetermined coefficient; and an input signal to the reservoir or a result of multiplying the input signal by a predetermined coefficient.

* * * * *